US009277295B2

(12) United States Patent
Pinder et al.

(10) Patent No.: US 9,277,295 B2
(45) Date of Patent: Mar. 1, 2016

(54) SECURING MEDIA CONTENT USING INTERCHANGEABLE ENCRYPTION KEY

(75) Inventors: Howard G. Pinder, Norcorss, GA (US); Andrew D. Maholski, Suwanee, GA (US)

(73) Assignee: Cisco Technology, Inc., San Jose, CA (US)

(*) Notice: Subject to any disclaimer, the term of this patent is extended or adjusted under 35 U.S.C. 154(b) by 848 days.

(21) Appl. No.: 11/454,421

(22) Filed: Jun. 16, 2006

(65) Prior Publication Data
US 2007/0294178 A1 Dec. 20, 2007

(51) Int. Cl.
*G06F 21/00* (2013.01)
*H04N 21/8355* (2011.01)
*G06F 21/10* (2013.01)
*H04N 7/167* (2011.01)
*H04N 21/254* (2011.01)
*H04N 21/433* (2011.01)
*H04N 21/4405* (2011.01)
*H04N 21/4408* (2011.01)
*H04N 21/4623* (2011.01)
(Continued)

(52) U.S. Cl.
CPC ............ *H04N 21/8355* (2013.01); *G06F 21/10* (2013.01); *H04N 7/1675* (2013.01); *H04N 21/2541* (2013.01); *H04N 21/4331* (2013.01); *H04N 21/4405* (2013.01); *H04N 21/4408* (2013.01); *H04N 21/4623* (2013.01); *H04N 21/4627* (2013.01); *H04N 21/4788* (2013.01); *H04N 21/835* (2013.01)

(58) Field of Classification Search
USPC .............. 705/57, 16, 21, 59, 71; 380/44, 262, 380/278, 279
See application file for complete search history.

(56) References Cited

U.S. PATENT DOCUMENTS

| 4,633,391 A | 12/1986 | Rundell |
| 5,224,161 A | 6/1993 | Daniel et al. |

(Continued)

FOREIGN PATENT DOCUMENTS

| EP | 0 782 296 | 7/1997 |
| EP | 1 014 715 | 6/2000 |

(Continued)

OTHER PUBLICATIONS

Canadian Office Action dated Aug. 3, 2012 cited in Appl. No. 2,655,677, 3 pgs.

(Continued)

*Primary Examiner* — Dante Ravetti
(74) *Attorney, Agent, or Firm* — Merchant & Gould P.C.

(57) ABSTRACT

An embodiment of a system for securing media content includes a digital media device comprising a memory associated with a secure element. The memory contains a private key and storage for at least one group key. The private key is used to decrypt transmissions from a remote access control system that are encrypted by a corresponding public key. The digital media device further comprises logic configured to respond to a first message received from the remote access control system encrypted by the public key and including a first group key, the logic responding to the first message by decrypting the first group key and storing the first group key in the memory of the secure element. The digital media device further comprises logic configured to decrypt a content key with the first group key. The content key is used to encrypt media content stored on a medium accessible by the digital media device.

19 Claims, 9 Drawing Sheets

(51) Int. Cl.
*H04N 21/4627* (2011.01)
*H04N 21/4788* (2011.01)
*H04N 21/835* (2011.01)

(56) References Cited

U.S. PATENT DOCUMENTS

| | | | |
|---|---|---|---|
| 5,299,263 A | 3/1994 | Beller et al. |
| 5,349,641 A | 9/1994 | Coutrot et al. |
| 5,422,953 A | 6/1995 | Fischer |
| 5,457,746 A | 10/1995 | Dolphin |
| 5,721,777 A | 2/1998 | Blaze |
| 5,742,677 A | 4/1998 | Pinder |
| 5,742,686 A | 4/1998 | Finley |
| 5,796,829 A | 8/1998 | Newby et al. |
| 5,856,975 A | 1/1999 | Rostoker et al. |
| 5,870,474 A | 2/1999 | Wasilewski |
| 5,872,846 A | 2/1999 | Ichikawa |
| 5,905,522 A | 5/1999 | Lawler |
| 5,915,068 A | 6/1999 | Levine |
| 5,917,822 A | 6/1999 | Lyles et al. |
| 5,933,503 A | 8/1999 | Schell et al. |
| 5,940,391 A | 8/1999 | Malkin et al. |
| 5,943,047 A | 8/1999 | Suzuki |
| 5,961,603 A | 10/1999 | Kunkel et al. |
| 5,987,572 A | 11/1999 | Weidner et al. |
| 5,990,881 A | 11/1999 | Inoue et al. |
| 5,990,927 A | 11/1999 | Hendricks et al. |
| 5,999,970 A | 12/1999 | Krisbergh et al. |
| 6,005,938 A | 12/1999 | Banker |
| 6,006,257 A | 12/1999 | Slezak |
| 6,012,068 A | 1/2000 | Boezeman et al. |
| 6,020,982 A | 2/2000 | Yamauchi et al. |
| 6,035,281 A | 3/2000 | Crosskey et al. |
| 6,057,872 A | 5/2000 | Candelore |
| 6,058,383 A | 5/2000 | Narasimhalu et al. |
| 6,088,455 A | 7/2000 | Logan et al. |
| 6,098,056 A | 8/2000 | Rusnak et al. |
| 6,105,134 A | 8/2000 | Pinder |
| 6,108,002 A | 8/2000 | Ishizaki |
| 6,118,976 A | 9/2000 | Arias et al. |
| 6,148,082 A | 11/2000 | Slattery et al. |
| 6,154,817 A | 11/2000 | Mohan et al. |
| 6,157,377 A | 12/2000 | Shah-Nazaroff et al. |
| 6,157,719 A | 12/2000 | Wasilewski et al. |
| 6,173,400 B1 | 1/2001 | Perlman et al. |
| 6,185,625 B1 | 2/2001 | Tso et al. |
| 6,209,090 B1 | 3/2001 | Aisenberg et al. |
| 6,216,231 B1 | 4/2001 | Stubblebine |
| 6,229,895 B1 | 5/2001 | Son et al. |
| 6,230,269 B1 | 5/2001 | Spies et al. |
| 6,237,786 B1 | 5/2001 | Ginter et al. |
| 6,246,767 B1 | 6/2001 | Akins |
| 6,252,964 B1 | 6/2001 | Wasilewski |
| 6,253,375 B1 | 6/2001 | Gordon et al. |
| 6,272,538 B1 | 8/2001 | Holden et al. |
| 6,292,568 B1 | 9/2001 | Akins, III et al. |
| 6,305,020 B1 | 10/2001 | Hoarty et al. |
| 6,324,548 B1 | 11/2001 | Sorenson |
| 6,345,307 B1 | 2/2002 | Booth |
| 6,356,971 B1 | 3/2002 | Katz et al. |
| 6,366,987 B1 | 4/2002 | Tzelnic et al. |
| 6,378,130 B1 | 4/2002 | Adams |
| 6,401,243 B1 | 6/2002 | Suzuki |
| 6,424,714 B1 | 7/2002 | Wasilewski |
| 6,424,717 B1 | 7/2002 | Pinder |
| 6,459,427 B1 | 10/2002 | Mao et al. |
| 6,484,182 B1 | 11/2002 | Dunphy et al. |
| 6,484,318 B1 | 11/2002 | Shioda et al. |
| 6,510,519 B2 | 1/2003 | Wasilewski |
| 6,516,412 B2 | 2/2003 | Wasilewski |
| 6,526,508 B2 | 2/2003 | Akins |
| 6,532,593 B1 | 3/2003 | Moroney |
| 6,543,053 B1 | 4/2003 | Li et al. |
| 6,549,577 B2 | 4/2003 | Florencio et al. |
| 6,550,008 B1 | 4/2003 | Zhang et al. |
| 6,560,340 B1 | 5/2003 | Akins |
| 6,574,609 B1 | 6/2003 | Downs et al. |
| 6,636,953 B2 | 10/2003 | Yuasa et al. |
| 6,694,025 B1 | 2/2004 | Epstein et al. |
| 6,727,944 B1 | 4/2004 | Adachi |
| 6,744,892 B2 | 6/2004 | Akins |
| 6,748,080 B2 | 6/2004 | Russ et al. |
| 6,802,077 B1 | 10/2004 | Schlarb |
| 6,804,357 B1 | 10/2004 | Ikonen et al. |
| 6,937,729 B2 | 8/2005 | Akins |
| 6,961,858 B2 | 11/2005 | Fransdonk |
| 6,963,972 B1 | 11/2005 | Chang et al. |
| 6,970,564 B1 | 11/2005 | Kubota et al. |
| 6,971,008 B2 | 11/2005 | Wasilewski |
| 7,020,635 B2 | 3/2006 | Hamilton et al. |
| 7,062,658 B2 | 6/2006 | Cheriton et al. |
| 7,065,216 B1 | 6/2006 | Benaloh et al. |
| 7,080,049 B2 | 7/2006 | Truitt et al. |
| 7,089,579 B1 | 8/2006 | Mao et al. |
| 7,090,128 B2 | 8/2006 | Farley et al. |
| 7,107,416 B2 | 9/2006 | Stuart et al. |
| 7,107,462 B2 | 9/2006 | Fransdonk |
| 7,124,303 B2 | 10/2006 | Candelore et al. |
| 7,127,619 B2 | 10/2006 | Unger et al. |
| 7,146,388 B2 | 12/2006 | Stakutis et al. |
| 7,150,045 B2 | 12/2006 | Koelle et al. |
| 7,151,831 B2 | 12/2006 | Candelore et al. |
| 7,155,609 B2 | 12/2006 | Chan et al. |
| 7,181,010 B2 | 2/2007 | Russ et al. |
| 7,197,638 B1 | 3/2007 | Grawrock et al. |
| 7,200,868 B2 | 4/2007 | Mattox et al. |
| 7,212,725 B2 | 5/2007 | Gunji et al. |
| 7,233,959 B2 | 6/2007 | Kanellos et al. |
| 7,287,168 B2 | 10/2007 | Candelore et al. |
| 7,363,326 B2 | 4/2008 | Margolus |
| 7,505,592 B2 | 3/2009 | Russ et al. |
| 7,515,712 B2 | 4/2009 | Wasilewski et al. |
| 7,519,999 B2 | 4/2009 | Sedacca |
| 7,587,502 B2 | 9/2009 | Crawford et al. |
| 7,602,913 B2 | 10/2009 | Wasilewski |
| 7,602,914 B2 | 10/2009 | Wasilewski |
| 7,630,499 B2 | 12/2009 | Wasilewski |
| 7,636,846 B1 | 12/2009 | Eskicioglu |
| 7,650,442 B2 | 1/2010 | Ashley et al. |
| 7,711,586 B2 | 5/2010 | Aggarwal et al. |
| 7,860,250 B2 | 12/2010 | Russ et al. |
| 7,861,082 B2 | 12/2010 | Pinder et al. |
| 7,949,133 B2 | 5/2011 | Pinder |
| 7,953,715 B2 | 5/2011 | Nishida |
| 7,971,261 B2 | 6/2011 | Pestoni |
| 7,978,720 B2 | 7/2011 | Russ et al. |
| 8,055,910 B2 | 11/2011 | Kocher et al. |
| 8,108,680 B2 | 1/2012 | Murray |
| 8,208,796 B2 | 6/2012 | Prus et al. |
| 8,732,849 B2 | 5/2014 | Ohbitsu |
| 8,856,951 B2 | 10/2014 | Yuki |
| 9,137,480 B2 | 9/2015 | Schlarb et al. |
| 2001/0006400 A1 | 7/2001 | Kubo et al. |
| 2001/0049824 A1 | 12/2001 | Baker et al. |
| 2002/0013772 A1 | 1/2002 | Peinado |
| 2002/0018130 A1 | 2/2002 | Suemoto et al. |
| 2002/0026582 A1* | 2/2002 | Futamura et al. ............ 713/170 |
| 2002/0044658 A1 | 4/2002 | Wasilewski et al. |
| 2002/0069172 A1 | 6/2002 | Omshehe et al. |
| 2002/0078153 A1 | 6/2002 | Chung et al. |
| 2002/0094084 A1 | 7/2002 | Wasilewski et al. |
| 2002/0099663 A1* | 7/2002 | Yoshino et al. ................. 705/65 |
| 2002/0101990 A1 | 8/2002 | Morino et al. |
| 2002/0104097 A1 | 8/2002 | Jerding et al. |
| 2002/0108122 A1 | 8/2002 | Alao et al. |
| 2002/0116708 A1 | 8/2002 | Morris et al. |
| 2002/0144067 A1 | 10/2002 | Jeong |
| 2002/0146237 A1 | 10/2002 | Safadi |
| 2002/0184457 A1 | 12/2002 | Yuasa et al. |
| 2002/0196939 A1 | 12/2002 | Unger et al. |
| 2002/0199190 A1 | 12/2002 | Su |
| 2003/0005446 A1 | 1/2003 | Jaff et al. |
| 2003/0005454 A1 | 1/2003 | Rodriguez et al. |
| 2003/0009668 A1 | 1/2003 | Chan |

(56) References Cited

U.S. PATENT DOCUMENTS

| | | |
|---|---|---|
| 2003/0021412 A1 | 1/2003 | Candelore et al. |
| 2003/0026423 A1 | 2/2003 | Unger et al. |
| 2003/0028890 A1 | 2/2003 | Swart |
| 2003/0035543 A1 | 2/2003 | Gillon et al. |
| 2003/0046686 A1 | 3/2003 | Candelore et al. |
| 2003/0081776 A1 | 5/2003 | Candelore et al. |
| 2003/0093680 A1 | 5/2003 | Astley et al. |
| 2003/0110234 A1 | 6/2003 | Egli et al. |
| 2003/0145329 A1 | 7/2003 | Candelore et al. |
| 2003/0159140 A1 | 8/2003 | Candelore et al. |
| 2003/0161473 A1 | 8/2003 | Fransdonk |
| 2003/0161617 A1 | 8/2003 | Um et al. |
| 2003/0174837 A1 | 9/2003 | Candelore et al. |
| 2003/0174844 A1* | 9/2003 | Candelore .......... G06Q 20/3674 380/277 |
| 2003/0182579 A1 | 9/2003 | Leporini et al. |
| 2003/0188164 A1 | 10/2003 | Okimoto et al. |
| 2003/0200337 A1 | 10/2003 | Jabri et al. |
| 2003/0233558 A1 | 12/2003 | Lieberman |
| 2004/0022307 A1 | 2/2004 | Dale et al. |
| 2004/0039911 A1 | 2/2004 | Oka et al. |
| 2004/0045030 A1 | 3/2004 | Reynolds et al. |
| 2004/0052377 A1 | 3/2004 | Mattox et al. |
| 2004/0068739 A1 | 4/2004 | Russ et al. |
| 2004/0073917 A1 | 4/2004 | Pedlow et al. |
| 2004/0088328 A1 | 5/2004 | Cook et al. |
| 2004/0098591 A1 | 5/2004 | Fahrny |
| 2004/0098603 A1 | 5/2004 | Corinne |
| 2004/0117831 A1 | 6/2004 | Ellis et al. |
| 2004/0123094 A1 | 6/2004 | Sprunk |
| 2004/0123313 A1 | 6/2004 | Koo et al. |
| 2004/0128499 A1 | 7/2004 | Peterka et al. |
| 2004/0187014 A1 | 9/2004 | Molaro |
| 2004/0193921 A1 | 9/2004 | Byrne |
| 2004/0228175 A1 | 11/2004 | Candelore et al. |
| 2004/0236804 A1 | 11/2004 | Bots et al. |
| 2004/0237100 A1 | 11/2004 | Pinder |
| 2005/0076066 A1 | 4/2005 | Stakutis et al. |
| 2005/0080497 A1 | 4/2005 | Rao |
| 2005/0091173 A1* | 4/2005 | Alve .................. G06Q 20/3829 705/71 |
| 2005/0100162 A1 | 5/2005 | Alve et al. |
| 2005/0102513 A1 | 5/2005 | Alve |
| 2005/0102702 A1 | 5/2005 | Candelore et al. |
| 2005/0105732 A1 | 5/2005 | Hutchings et al. |
| 2005/0111835 A1 | 5/2005 | Friel et al. |
| 2005/0125357 A1 | 6/2005 | Saadat et al. |
| 2005/0169467 A1 | 8/2005 | Risan et al. |
| 2005/0169473 A1 | 8/2005 | Candelore et al. |
| 2005/0180568 A1 | 8/2005 | Krause |
| 2005/0192904 A1 | 9/2005 | Candelore et al. |
| 2005/0201559 A1 | 9/2005 | Van Der Heijden |
| 2005/0213147 A1* | 9/2005 | Minatogawa ....... G06F 17/3089 358/1.15 |
| 2005/0223414 A1 | 10/2005 | Kenrich et al. |
| 2005/0232593 A1 | 10/2005 | Kanai |
| 2005/0237396 A1 | 10/2005 | Hagiwara et al. |
| 2005/0240708 A1 | 10/2005 | Shaver et al. |
| 2005/0240974 A1 | 10/2005 | Hiramoto et al. |
| 2006/0013566 A1 | 1/2006 | Nakamura |
| 2006/0020786 A1 | 1/2006 | Helms et al. |
| 2006/0039256 A1 | 2/2006 | Nakamura et al. |
| 2006/0039559 A1 | 2/2006 | Wasilewski |
| 2006/0039560 A1 | 2/2006 | Wasilewski |
| 2006/0041905 A1 | 2/2006 | Wasilewski |
| 2006/0072752 A1 | 4/2006 | Nakano et al. |
| 2006/0074807 A1 | 4/2006 | Gauba et al. |
| 2006/0093325 A1* | 5/2006 | Imai ...................... H04N 5/775 386/296 |
| 2006/0109854 A1 | 5/2006 | Cancel |
| 2006/0115083 A1 | 6/2006 | Candelore et al. |
| 2006/0153379 A1 | 7/2006 | Candelore et al. |
| 2006/0156382 A1 | 7/2006 | Motoyama |
| 2006/0179478 A1* | 8/2006 | Han ...................... H04L 9/0822 726/5 |
| 2006/0184733 A1 | 8/2006 | Yamamoto et al. |
| 2006/0187951 A1 | 8/2006 | Ginzburg et al. |
| 2006/0190408 A1 | 8/2006 | Cook et al. |
| 2006/0200865 A1* | 9/2006 | Leake et al. .................... 726/27 |
| 2006/0262926 A1 | 11/2006 | Candelore et al. |
| 2006/0269060 A1 | 11/2006 | Candelore et al. |
| 2006/0294017 A1 | 12/2006 | Kim et al. |
| 2007/0055390 A1 | 3/2007 | Simon et al. |
| 2007/0099694 A1 | 5/2007 | McCarthy et al. |
| 2007/0130254 A1 | 6/2007 | Russ et al. |
| 2007/0150960 A1 | 6/2007 | Dubroeucq et al. |
| 2007/0189525 A1 | 8/2007 | Wajs |
| 2007/0192586 A1 | 8/2007 | McNeely |
| 2007/0204146 A1 | 8/2007 | Pedlow et al. |
| 2007/0219917 A1 | 9/2007 | Liu et al. |
| 2007/0239608 A1 | 10/2007 | Elbring |
| 2007/0245148 A1 | 10/2007 | Buer |
| 2007/0277205 A1 | 11/2007 | Grannan |
| 2007/0291940 A1 | 12/2007 | Candelore et al. |
| 2007/0294170 A1 | 12/2007 | Vantalon et al. |
| 2008/0005030 A1 | 1/2008 | Schlarb et al. |
| 2008/0137852 A1 | 6/2008 | Mamidwar |
| 2008/0170687 A1 | 7/2008 | Moors et al. |
| 2008/0177998 A1 | 7/2008 | Apsangi et al. |
| 2009/0028327 A1 | 1/2009 | Pinder |
| 2009/0031409 A1 | 1/2009 | Murray |
| 2009/0048978 A1 | 2/2009 | Ginter et al. |
| 2009/0080648 A1 | 3/2009 | Pinder |
| 2009/0089369 A1 | 4/2009 | Russ et al. |
| 2013/0332976 A1 | 12/2013 | Shenker et al. |

FOREIGN PATENT DOCUMENTS

| | | |
|---|---|---|
| EP | 1 161 087 A2 | 12/2001 |
| EP | 1 213 919 | 12/2002 |
| EP | 1 447 983 A1 | 8/2004 |
| EP | 1 760 619 | 3/2007 |
| FR | 2 779 599 | 12/1999 |
| GB | 2 403 586 A | 1/2005 |
| KR | 10-2003-0037098 | 5/2003 |
| KR | 10-2004-0062662 | 7/2004 |
| WO | WO 00/11840 | 3/2000 |
| WO | WO 00/50978 | 8/2000 |
| WO | WO 00/51041 | 8/2000 |
| WO | WO 01/18807 | 3/2001 |
| WO | WO 01/18807 A2 | 3/2001 |
| WO | WO 01/75876 | 10/2001 |
| WO | WO 01/82588 | 11/2001 |
| WO | WO 02/097997 | 12/2002 |
| WO | WO 2004/023262 A2 | 3/2004 |
| WO | WO 2004/098190 | 11/2004 |
| WO | WO 2005/029843 | 3/2005 |
| WO | WO 2005/029852 | 3/2005 |
| WO | WO 2005/091626 | 9/2005 |
| WO | WO 2005/101411 | 10/2005 |
| WO | WO 2006/038204 | 4/2006 |
| WO | WO 2006/066052 | 6/2006 |
| WO | WO 2008/005699 | 1/2008 |
| WO | WO 2008/005700 | 1/2008 |
| WO | WO 2009/015116 A1 | 1/2009 |
| WO | WO 2009/018006 | 2/2009 |
| WO | WO 2009/042532 | 4/2009 |

OTHER PUBLICATIONS

Canadian Office Action dated Nov. 1, 2012 cited in Application No. 2,694,201, 3 pgs.

European Office Action dated Nov. 14, 2012 cited in Application No. 08 782 173.2, 6 pgs.

European Office Communication dated Oct. 5, 2012 cited in Appl. No. 07 798 910.1, 7 pgs.

European Office Communication dated Oct. 16, 2012 cited in Appl. No. 11 169 374.3, 7 pgs.

Canadian Office Action dated Jan. 22, 2013 cited in Appl. No. 2,655,530, 5 pgs.

Canadian Office Action dated Feb. 1, 2013 cited in Appl. No. 2,655,114, 9 pgs.

(56) References Cited

OTHER PUBLICATIONS

U.S. Final Office Action dated Dec. 15, 2014 cited in U.S. Appl. No. 11/428,367, 21 pgs.
Extended European Search Report dated Dec. 22, 2011 cited in Application No. 11169374.3, 9 pgs.
Canadian Final Action dated Jan. 16, 2015 cited in Appl. No. 2,655,531, 7 pgs.
The Norton Commander running under the DOS and Windows operating systems officially produced between 1986 and 1998, 4 pgs. (http://en.wikipedia.org/wiki/Norton_Commander).
The Windows File Manager released between 1990 and 1999, 3 pgs. (http://en.wikipedia.org/wiki/File_Manager_(Windows)).
The iTunes application, 18 pgs. (http://en.wikipedia.org/wiki/iTunes_Store) introduced to the public on Apr. 28, 2003.
International Search Report and Written Opinion mailed Sep. 16, 2008 in PCT/US2008/070707.
International Search Report dated Dec. 12, 2008 in PCT/US2008/070690.
Written Opinion dated Dec. 12, 2008 in PCT/US2008/070690.
International Search Report dated Apr. 28, 2009 in PCT/US2008/077157.
International Preliminary Report on Patentability dated Mar. 30, 2010 in PCT/US2008/077157.
EP Communication dated May 6, 2010 in Application No. 08 833 391.9-1244.
U.S. Official Action mailed Jun. 17, 2010 in U.S. Appl. No. 11/781,412.
U.S. Official Action mailed Aug. 16, 2010 in U.S. Appl. No. 11/829,647.
U.S. Official Action mailed Aug. 31, 2010 in U.S. Appl. No. 11/861,328.
U.S. Official Action mailed Dec. 8, 2010 in U.S. Appl. No. 11/781,412.
U.S. Official Action mailed Feb. 2, 2011 in U.S. Appl. No. 11/829,647.
U.S. Appl. No. 09/111,958, filed Jul. 8, 1998, entitled "Mechanism and Apparatus for Encapsulation of Entitlement Authorization in Conditional Access System," Inventor: Defreese et al.
U.S. Office Action dated Jun. 12, 2014 cited in U.S. Appl. No. 11/428,367, 54 pgs.
Canadian Office Action dated Sep. 21, 2011 cited in Application No. 2,655,677.
Canadian Office Action dated Sep. 21, 2011 cited in Application No. 2,655,531.
U.S. Office Action dated Oct. 19, 2011 cited in U.S. Appl. No. 11/405,205.
European Decision to Refuse dated Oct. 7, 2013 cited in Appl. No. 11 169 374.3, 13 pgs.
Canadian Office Action dated Oct. 24, 2013 cited in Appl. No. 2,655,530, 6 pgs.
Canadian Office Action dated Jun. 14, 2013 cited in Application No. 2,655,536, 3 pgs.
Canadian Office Action dated Dec. 9, 2013 cited in Application No. 2,694,201, 2 pgs.
Allway Sync (Allway Sync 3.2.2), Dec. 6, 2005, pp. 1-14.
Barton "TiVO—Lution: The Challenges of delivery a reliable, easy-to-use DVR service to the masses" ACM QUEUE Apr. 2006 35 more queue: www.acmqueue.com.
Blackcurrant, ("Delete Files Across a Network"), May 11, 2005; accessed Jul. 2, 2010 at http://techrepublic.com.com/5208-6230-0.html?forumID=3&threadID=173478&start=0; 3 pgs.
Boston College, "Copying Files to a USB Drive or External Hard Drive," Nov. 8, 2005, pp. 1-5 http://web.archive.org/web/20060227003853/http://www.bc.edu/offices/help/met-elements/doc/articles/html/HW-usb-drive-copy.shtml.
Chorianopoulous et al. "Affective Usability Evaluation for an Interactive Music Television Channel" ACM Computers in Entertainment, vol. 2, No. 3, Jul. 2004, Article 7b.

Dybwad, B.; ("TiVo 7.2 OS Adds Red Flag Content Protection Feature"), Sep. 14, 2005, pp. 1-5, http://www.engadget.com/2005/09/14/tivo-7-2-os-adds-red-flag-content-protection-feature/.
Ellison, "TiVo Series 2", Jan. 13, 2004, pp. 1-6, http://www.pcmag.com/article2/8,2817,1649659,00.asp.
Eskicioglu et al. "An overview of multimedia content protection in consumer electronics devices," Signal Processing. Image Communication, Elsevier Science Publishers, Ambsterdam, NL, vol. 16, No. 7, Apr. 2001, pp. 681-699, XP004232133 ISSN: 0923-5965.
Haughey, M.; ("PC to TiVo Playback Released"), Oct. 24, 2005, pp. 1-13 http://web.archive.org/web/20051024002825/http://www.pvrblog.com/pvr/2005/08/pc_to_tivo_play.html.
Haughey, M.; ("TiVo 7.2 OS Adds Content Protection, Blocks Transfers, and Auto-Deletes Some Shows"), Sep. 13, 2005, pp. 1-14, http://www.pvrblog.com/pvr/2005/09/tivo_72_os_adds.html.
Menezes, et al.; "Handbook of Applied Cryptography" Handbook of applied Cryptography, CRC Press Series on Discrete Mathematics and Its Applications, Boca Raton, FL CRC Press, 1997, pp. 546, 567-570, XP002356116 ISBN: 0-8493-8523-7.
Old Apps, ("Old Version of WinSCP"), Jan. 13, 2003, pp. 1-3; accessed Jul. 2, 2010 at http://www.oldapps.com/WinSCP.php?old_winscp=2; 3 pgs.
Picker, "The Digital Video Recorder: Unbundling Advertising and Content" Professor of Commercial Law, The University of Chicago Law School, Senior Fellow, The Computation Institute of the University of Chicago and Argonne National Laboratory; Sep. 10, 2003.
Smith, J.; "Files and Folders: Removable Media," Oct. 13, 2004, pp. 1-12 http://web.archive.org/web/20041027194919/http://www.jegsworks.com/Lessons/win/filesandfolders/step-removabledisk.htm.
TiVo.com "What is TiVo?", Jan. 14, 2005, pp. 1-12; http://web.archive.org/web/20050114053806/http://www.tivo.com/1.0.asp.
WinFtp, Sep. 8, 2005, pp. 1-7 http://download.cnet.com/WinFtp-Client/3000-2160_4-10429297.html.
Wurmlin et al. "3D Video Record" Proceedings of the 10th Pacific Conference on Computer Graphics and Applications (PG'02) IEEE Computer Society.
International Search Report dated Oct. 22, 2003 in PCT/US2003/016585.
International Search Report and Written Opinion dated Jun. 7, 2006, cited in PCT/US2005/022069.
International Search Report and Written Opinion dated Dec. 21, 2007, cited in PCT/US2007/071842.
International Search Report cited in PCT/US2007/071843 mailed Dec. 27, 2007.
Supplemental European Search Report dated Jan. 24, 2008, in Application No. 03 755 496.01.
International Search Report dated Jan. 31, 2008, in PCT/US2007/070680.
International Search Report and Written Opinion dated Mar. 10, 2008, cited in PCT/US2007/071841.
European Office Action mailed Jul. 24, 2008 in Application No. 03 755 496.1.
International Preliminary Report mailed Jan. 6, 2009, in PCT/US2007/072328.
European Office Action mailed Feb. 10, 2009, in Application No. 07798909.3.
European Office Action mailed Feb. 11, 2009, in Application No. 07798908.5.
European Office Action mailed Feb. 18, 2009, in Application No. 07 798 909.3.
European Office Action mailed Mar. 16, 2009, in Application No. 07 781 952.2.
European Office Action mailed Apr. 29, 2009 in Application No. 07 784 510.5.
European Office Action mailed Apr. 29, 2009 in Application No. 07 798 908.5.
European Office Action mailed May 7, 2009 in Application No. 07 840 308.6.
European Office Action mailed May 11, 2009 in Application No. 05 766 482.3.
European Office Action mailed Jun. 9, 2009 in Application No. 07 815 092.7.

(56) References Cited

OTHER PUBLICATIONS

Australian Office Action mailed Aug. 4, 2009 in Application 2005258137.
Canadian Office Action mailed Aug. 19, 2009 in Application 2,571,533.
Notice of Preliminary Rejection dated May 28, 2010, cited in KR Appl. No. 10-2008-7031848, 7 pgs.
European Office Action mailed Sep. 9, 2010 in Application No. 07 840 308.6.
Notice of Preliminary Rejection dated Sep. 18, 2010 cited in Korean Application No. 10-2008-7032127.
Notice of Preliminary Rejection dated Oct. 25, 2010 cited in Korean Application No. 10-2008-7030549.
Notice of Final Rejection dated Nov. 26, 2010 cited in Korean Application No. 10-2008-7031848.
Office Action mailed Aug. 20, 2007, in U.S. Appl. No. 10/873,805.
Office Action mailed Jan. 9, 2008, in U.S. Appl. No. 10/873,805.
Office Action mailed Apr. 30, 2008, in U.S. Appl. No. 11/482,356.
Office Action mailed Jul. 9, 2008, in U.S. Appl. No. 10/873,805.
Office Action mailed Aug. 5, 2008, in U.S. Appl. No. 11/428,357.
Office Action mailed Sep. 30, 2008, in U.S. Appl. No. 11/428,362.
Office Action mailed Nov. 28, 2008, in U.S. Appl. No. 11/482,356.
Office Action mailed Dec. 12, 2008, in U.S. Appl. No. 11/428,365.
Office Action mailed Dec. 17, 2008, in U.S. Appl. No. 10/873,805.
Office Action mailed Mar. 18, 2009, in U.S. Appl. No. 11/428,362.
Office Action mailed Apr. 2, 2009, in U.S. Appl. No. 11/428,357.
Office Action mailed May 28, 2009, in U.S. Appl. No. 11/428,365.
Office Action mailed Jul. 22, 2009, in U.S. Appl. No. 11/428,357.
Office Action mailed Aug. 4, 2009, in U.S. Appl. No. 11/428,356.
Office Action mailed Aug. 7, 2009, in U.S. Appl. No. 11/428,362.
Office Action mailed Sep. 22, 2009, in U.S. Appl. No. 11/454,421.
Office Action mailed Oct. 7, 2009, in U.S. Appl. No. 11/428,367.
Office Action mailed Oct. 26, 2009, in U.S. Appl. No. 11/428,365.
Office Action mailed Oct. 28, 2009, in U.S. Appl. No. 11/942,778.
Office Action mailed Dec. 9, 2009, in U.S. Appl. No. 11/428,357.
Office Action mailed Jan. 14, 2010, in U.S. Appl. No. 11/428,362.
Office Action mailed Feb. 1, 2010, in U.S. Appl. No. 11/428,356.
Office Action mailed Feb. 24, 2010, in U.S. Appl. No. 12/327,157.
Office Action mailed Apr. 1, 2010, in U.S. Appl. No. 11/405,205.
Office Action mailed Apr. 14, 2010, in U.S. Appl. No. 11/428,367.
Office Action mailed May 5, 2010, in U.S. Appl. No. 11/428,365.
Office Action mailed May 11, 2010, in U.S. Appl. No. 11/428,357.
Office Action mailed May 26, 2010, in U.S. Appl. No. 11/428,362.
Office Action mailed Aug. 31, 2010 in U.S. Appl. No. 11/405,205.
Office Action mailed Oct. 14, 2010 in U.S. Appl. No. 11/428,365.
Office Action mailed Oct. 26, 2010 in U.S. Appl. No. 11/428,357.
Office Action mailed Nov. 2, 2010 in U.S. Appl. No. 11/428,362.
"Explorer 8300 Series Digital Recorder" ScientificAtlanta.com [online] Oct. 2005, XP002459851, Retrieved from the internet: URL:http://www.cisco.com/application/pdf/en/us/guest/products/ps8613/c1650/cdccont_0900aecd806c6913.pdf [retrieved on Nov. 22, 2007].
Gilo: "Do It Yourself Making an External Hard Drive Guide" Notebookreview.com, [online], Jun. 2, 2006, XP002459852, Retrieved from the internet: URL:http://www.notebookreview.com/default.asp?newsID=2972 [retrieved on Nov. 22, 2007].
U.S. Appl. No. 10/873,805, filed Jun. 22, 2004, Entitled "Validating Client Receivers," Inventors: Pinder et al.
U.S. Appl. No. 10/920,926, filed Aug. 18, 2004, Entitled "Retrieval and Transfer of Encrypted Hard Drive Content from Digital Video Receiver Set Top Box," Inventor: Wasilewski, Anthony.
U.S. Appl. No. 10/920,841, filed Aug. 18, 2004, Entitled "Retrieval and Transfer of Encrypted Hard Drive Content from Digital Video Receiver Set Top Box Utilizing Second Digital Video Receiver Set Top Box," Inventor: Wasilewski, Anthony.
U.S. Appl. No. 10/920,842, filed Aug. 18, 2004, Entitled "Utilization of Encrypted Hard Drive Content by One Digital Video Receiver Set Top Box when Recorded by Another," Inventor: Wasilewski, Anthony.
U.S. Appl. No. 11/405,205, filed Apr. 17, 2006, Entitled "System and Method for Prioritizing the Storage Location of Media Data," Inventors: Prus et al.
U.S. Appl. No. 11/428,367, filed Jun. 30, 2006, Entitled "Secure Escrow and Recovery of Media Device Content Keys," Inventors: Schlarb et al.
U.S. Appl. No. 11/428,362, filed Jun. 30, 2006, Entitled "System and Method for Managing Media Data," Inventors: Prus et al.
U.S. Appl. No. 11/428,356, filed Jun. 30, 2006, Entitled "System and Method for Applying Retention Rules," Inventors: Prus et al.
U.S. Appl. No. 11/428,357, filed Jun. 30, 2006, Entitled "Digital Media Device having Selectable Media Content Storage Locations," Inventors: Prus et al.
U.S. Appl. No. 11/428,365, filed Jun. 30, 2006, Entitled "Digital Media Device having Media Content Transfer Capability," Inventors: Russ et al.
U.S. Appl. No. 11/671,506, filed Feb. 6, 2007, Entitled "Apparatus for Entitling and Transmitting Service Instances to Remote Client Devices," Inventors: Russ et al.
U.S. Appl. No. 11/942,778, filed Nov. 20, 2007, Entitled "Retrieval and Transfer of Encrypted Hard Drive Content from Digital Video Receiver Set Top Box to a Content Transcription Device," Inventor: Wasilewski, Anthony.
Chinese First Office Action dated Feb. 29, 2012 cited in Application No. 200880108773.4, 10 pgs.
Canadian Office Action mailed Jan. 12, 2011 in Application No. 2,571,533.
Canadian Office Action mailed Feb. 2, 2011 in Application No. 2,652,745.
European Office Action dated Apr. 4, 2011 in Application No. 07 815 092.7.
European Office Action dated Apr. 21, 2011 in Application No. 07 798 909.3.
U.S. Official Action mailed Apr. 21, 2011 in U.S. Appl. No. 11/781,412.
Canadian Office Action dated Jul. 4, 2012 cited in Application No. 2,655,114, 3 pgs.
Canadian Office Action dated Dec. 9, 2014 cited in Appl. No. 2,655,677, 5 pgs.
European Summons to Attend Oral Proceedings dated Aug. 1, 2012 cited in Appl. No. 07840308.6, 7 pgs.
European Office Action dated Oct. 11, 2013 cited in Appl. No. 07 781 952.2, 4 pgs.
Canadian Office Action dated Nov. 26, 2014 cited in Appl. No. 2,655,526, 6 pgs.
iPod shuffle User's Guide (Apple Computer, Inc.) 2005 (http://manuals.info.apple.com/en_US/iPodshuffleUserGuide.pdf), 32 pgs.
European Office Action dated Jan. 18, 2012 cited in Appl. No. 07 781 952.2, 5 pgs.
European Summons to Attend Oral Proceedings dated May 14, 2013 cited in Application No. 11169374.3, 8 pgs.
Canadian Office Action dated May 3, 2012 cited in Application No. 2,655,531, 3 pgs.
Canadian Office Action dated May 10, 2012 cited in Application No. 2,655,536, 3 pgs.
Canadian Office Action dated May 10, 2012 cited in Application No. 2,655,526, 3 pgs.
Canadian Office Action dated Jun. 10, 2013 cited in Application No. 2,655,531, 5 pgs.
Canadian Office Action mailed Jun. 13, 2011 cited in Application No. 2,655,536.
Canadian Office Action mailed Jun. 13, 2011 cited in Application No. 2,655,526.
European Summons to Attend Oral Proceedings dated Jun. 26, 2014 cited in Application No. 07798910.1, 6 pgs.
Canadian Office Action dated Jun. 27, 2014 cited in Application No. 2,655,530, 2 pgs.
Canadian Office Action dated Jun. 14, 2013 cited in Appl. No. 2,655,526, 5 pgs.
Canadian Office Action dated Aug. 24, 2011 cited in Application No. 2,655,114.
Canadian Office Action dated Aug. 29, 2011 cited in Application No. 2,655,530.

(56) References Cited

OTHER PUBLICATIONS

Canadian Office Action dated Sep. 2, 2011 cited in Application No. 2,652,745.
European Decision to Refuse dated Jul. 26, 2011 cited in Application No. 07 815 092.7-1245.
Korean Notice of Final Rejection dated Jul. 28, 2011 cited in Application No. 10-2008-7030549.
Canadian Office Action dated Apr. 16, 2012 cited in Application No. 2,655,530, 3 pgs.
Canadian Office Action dated Nov. 27, 2014 cited in Appl. No. 2,694,201, 3 pgs.
Canadian Office Action dated Sep. 22, 2015 cited in Application No. 2,694,201, 3 pgs.
Canadian Office Action dated Sep. 25, 2015 cited in Application No. 2,655,526, 3 pgs.

* cited by examiner

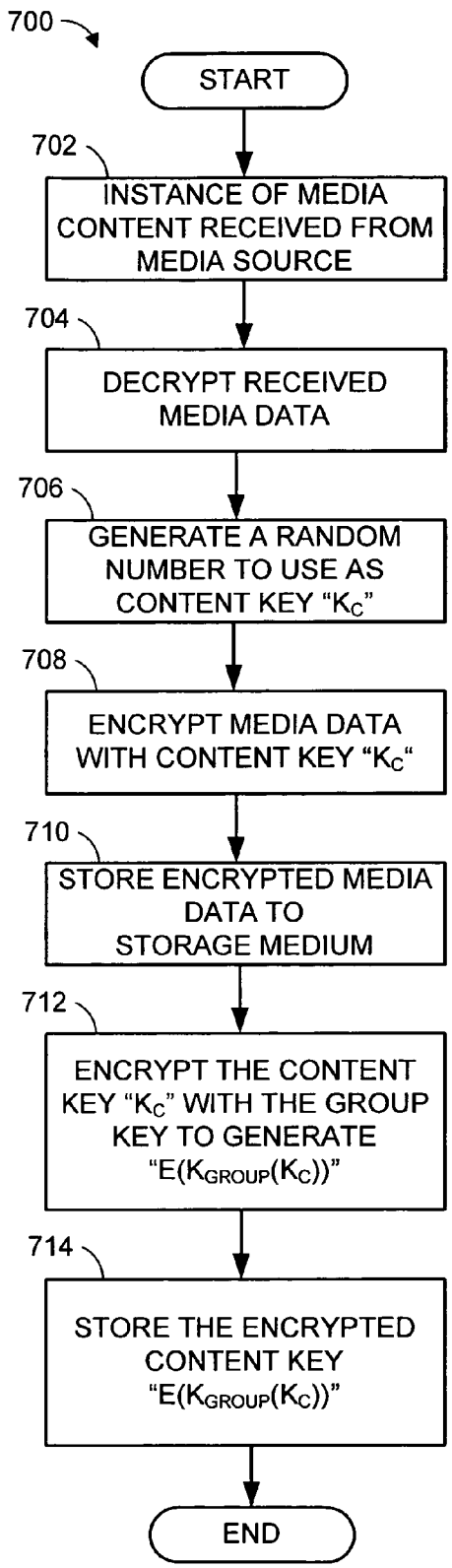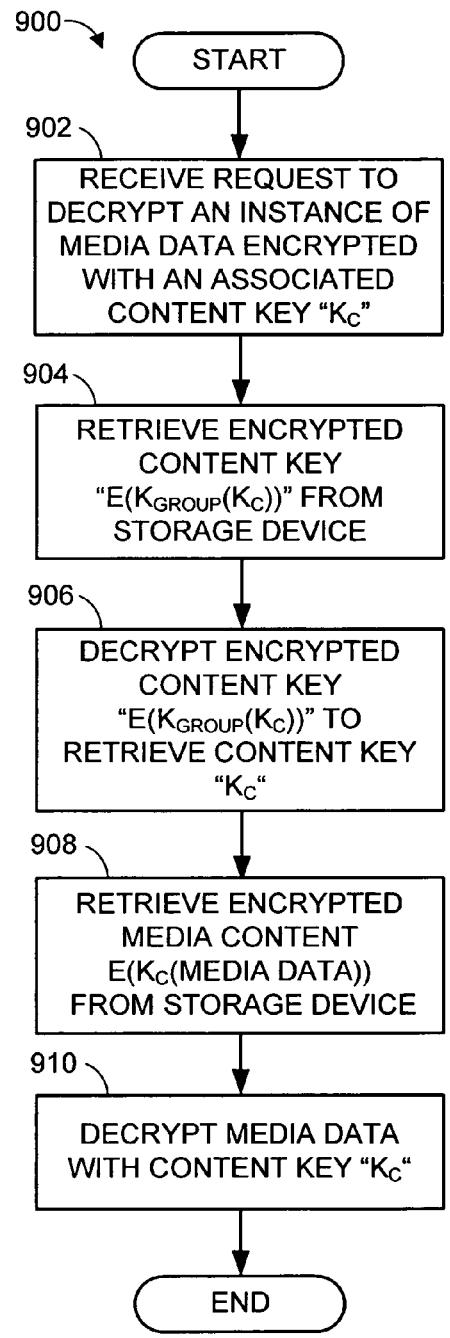
FIG. 7
FIG. 9

SECURING MEDIA CONTENT USING INTERCHANGEABLE ENCRYPTION KEY

BACKGROUND

1. Technical Field

The present disclosure generally relates to securing data, and more particularly, to securing data associated with a digital media device using an encryption key.

2. Description of the Related Art

A storage device, such as a hard drive of a digital media recording device, can be used to store media data associated with received audio and/or video content. For example, one such digital media recording device is a digital video recorder (DVR). A DVR application executed by the DVR provides user interface screens that can be used to manage the media data stored to the storage device. The DVR application can also be used to playback recorded media at a later time, while also having the ability to pause, rewind, and fast-forward through the recorded media.

The media data stored to the DVR can be encrypted in order to protect the media content from unauthorized playback. A secure microprocessor can be used to protect the encryption keys that are used by DVR encryption processors to encrypt the content. The secure microprocessor includes a private key stored therein, useful for decrypting data encrypted using an associated public key. The secure microprocessor can also be used to generate a content instance key of suitable strength to encrypt the media data on the storage device. The content instance key could be a random value (or passphrase, etc.) for example. The content instance key is then encrypted using the secure microprocessor's public key and stored on the storage device in association with the encrypted content and any other digital access rights elements.

Upon request for playback of the media content embodied in the media data, the encrypted content instance key associated with the media data is retrieved from the storage device and decrypted by the private key of the secure microprocessor. The media data can then be retrieved and the content key can then be used to decrypt the media data for playback.

However, because the encrypted content instance key is associated with the private key of a particular secure microprocessor, when a DVR fails it may not be possible to access the secure microprocessor to allow decryption of the stored content from the failed DVR's storage device. Thus, a cable subscriber's library of recorded and encrypted media content becomes inaccessible for playback. This may be so, even though the user may be legally entitled to play the media content, e.g., after paying for that right. Additionally, tying the media content to a particular DVR introduces problems with respect to the sharing of digital media between devices. For example, in some cases, a subscriber may be authorized to view content recorded by a first DVR within the subscriber household on another, second DVR within the subscriber household. However, because the encrypted media content is tied to the secure microprocessor in the first DVR used to record the media, such sharing becomes difficult.

Further, subscribers to media services, such as cable-television, among others, may be authorized and de-authorized for the viewing of media content based on a subscriber's subscription status. For example, this change in authorization may be carried out through the transmission of media access signals from a cable-operator's head-end system to an associated set-top box. However, these media-access signals may simply set a flag or other non-secure logical switch within the set-top that allows or disallows the specified service. However, those wishing to steal the service may be able to easily overcome such trivial barriers, allowing the media data already stored on the DVR associated with the set-top box to be accessible.

Therefore, what is needed are systems and methods that can potentially address one or more of the aforementioned deficiencies.

BRIEF DESCRIPTION OF THE DRAWINGS

The components in the drawings are not necessarily to scale relative to each other. Like reference numerals designate corresponding parts throughout the several views.

FIG. 7 depicts a flow diagram of a process for encrypting media data using a group key stored within the DVR of FIG. 3.

FIG. 9 depicts a flow diagram of an exemplary process for decrypting media data using a group key.

DETAILED DESCRIPTION

Figure 1:
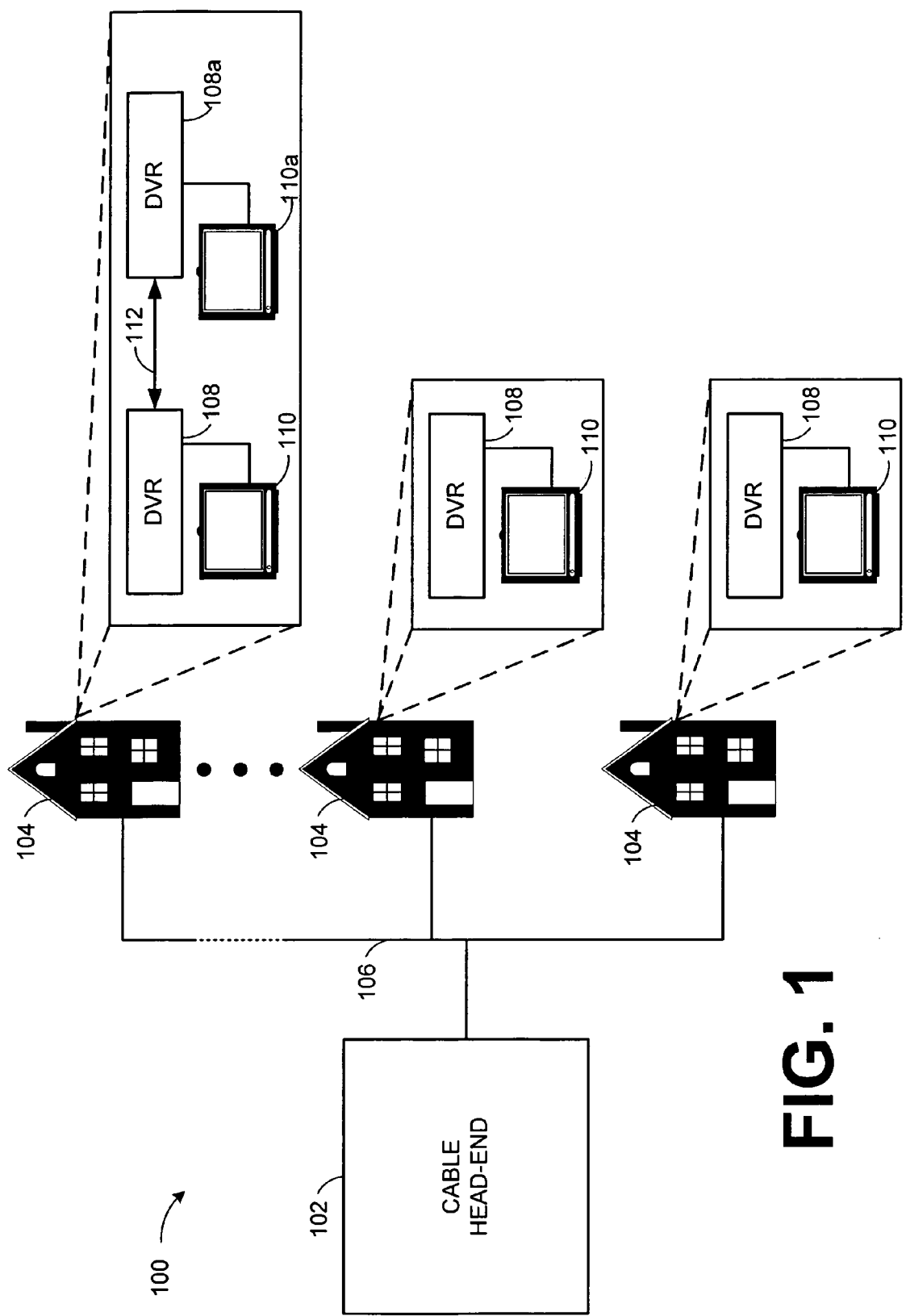
FIG. 1 depicts a block diagram of an arrangement of a secure data delivery system in which embodiments of the described systems and methods for securing media content using an interchangeable encryption key may be implemented.

FIG. 1 depicts a secure data delivery system 100 in which embodiments of the described systems and methods for securing media content using interchangeable encryption keys may be implemented. System 100 may be used, among other purposes, for coordinating the exchange of information capable of being used to secure media content stored on devices located remote from a media provider, such as a cable-television or digital satellite television provider, for example.

Media content could comprise audio, video, images, text, teletext, among others. According to some embodiments, media content, as referred to herein, may also be referred to as media programs or media programming. Some examples of media programming used herein include, but are not be intended to be limited to, television programs and radio programs. Such television programs and/or radio programs could be scheduled broadcasts or delivered to a user on-demand (e.g. such as provided with a video-on demand system). The media content could be unicast to a single user, or could be multi-cast or otherwise broadcast to multiple users.

An instance of media content (or media programming, etc.) could be, for example, a television show (e.g. an episode of Smallville). A series of media programming could be, for example, a number of episodes of a television show (e.g. the last five recordings of Smallville). The media content can be received and recorded by the remote devices. For example, the media content can be stored to a storage medium as media data. In some instances, such media data is encoded audio and/or video signals, among other potential representations of the media content that is in a form suitable for processing by the DVR 108.

Looking to FIG. 1, according to some embodiments, cable head-end 102 may deliver media content and/or the information capable of being used to secure media content stored on devices located remote from a media provider over a transmission medium 106, which may be one or more of twisted-pair telephone wire, coaxial cable, optical fiber, over-the-air waves, etc. The remote devices may be located at, for example, user premises 104.

Accordingly, the media content may be received by a remote device within the user premises 104 that is capable of receiving and, possibly, decoding the media content. The remote device may, for example, form part of, be associated with, or be integrated in one or more of a cable-television set-top box, a television, portable device, digital video recorder (DVR), personal video recorder (PVR), a personal digital recorder (PDR), and/or a personal computer, laptop computer, or personal digital assistant (PDA), among others.

According to some embodiments, the remote device comprises a set-top box having an integrated media recording capabilities. For the purposes of illustration, one such device configured to execute media recording capabilities is DVR 108. DVR 108 may be configured to record received media content and store associated media data on a storage medium. According to some embodiments, the media data may be later accessed for playback on a playback device, such as television 110, at a later time. The playback device could also be one or more of a computer monitor, an audio receiver, or other device capable of emitting sound or images pertaining to the media content.

According to some embodiments, a user premises 104 can have multiple DVRs. Depicted in the upper right portion of FIG. 1, for example, a second DVR 108a is associated with the respective user premises. DVR 108a, according to some embodiments, is associated with a respective display device 110a. In some instances, DVR 108a is in communication with DVR 108 over communication medium 112. For example, the communication medium 112 could be twisted pair, Ethernet, or any type of wired or wireless network. DVR108 and DVR 108a, and any other DVRs that may be present at user premises 104, may communicate directly or through one or more other devices in a local-area-network (LAN). In some cases, DVRs 108 and 108a can share media content and/or programming guide information, among other DVR related information, over the communication medium 112.

Although embodiments are described within the environment of a cable-television system, it should be understood that other media delivery and/or receiving devices are intended to fall within the scope of the invention. For example, the media source could be a satellite television provider or even a media server on the Internet. The remote device could be a satellite television decoder or a computer configured to receive the media content. The media recorder could be any device, such as a personal computer, that is configured with media recording and/or playback ability. Additionally, although the media content may be described as comprising video and audio content, some embodiments may include only audio or only video. The media content could even comprise text or other forms of media. Further, in some instances, non-media information (e.g. security keys, digital-rights management (DRM) information, etc.) may be transmitted along with the media content.

Figure 2:
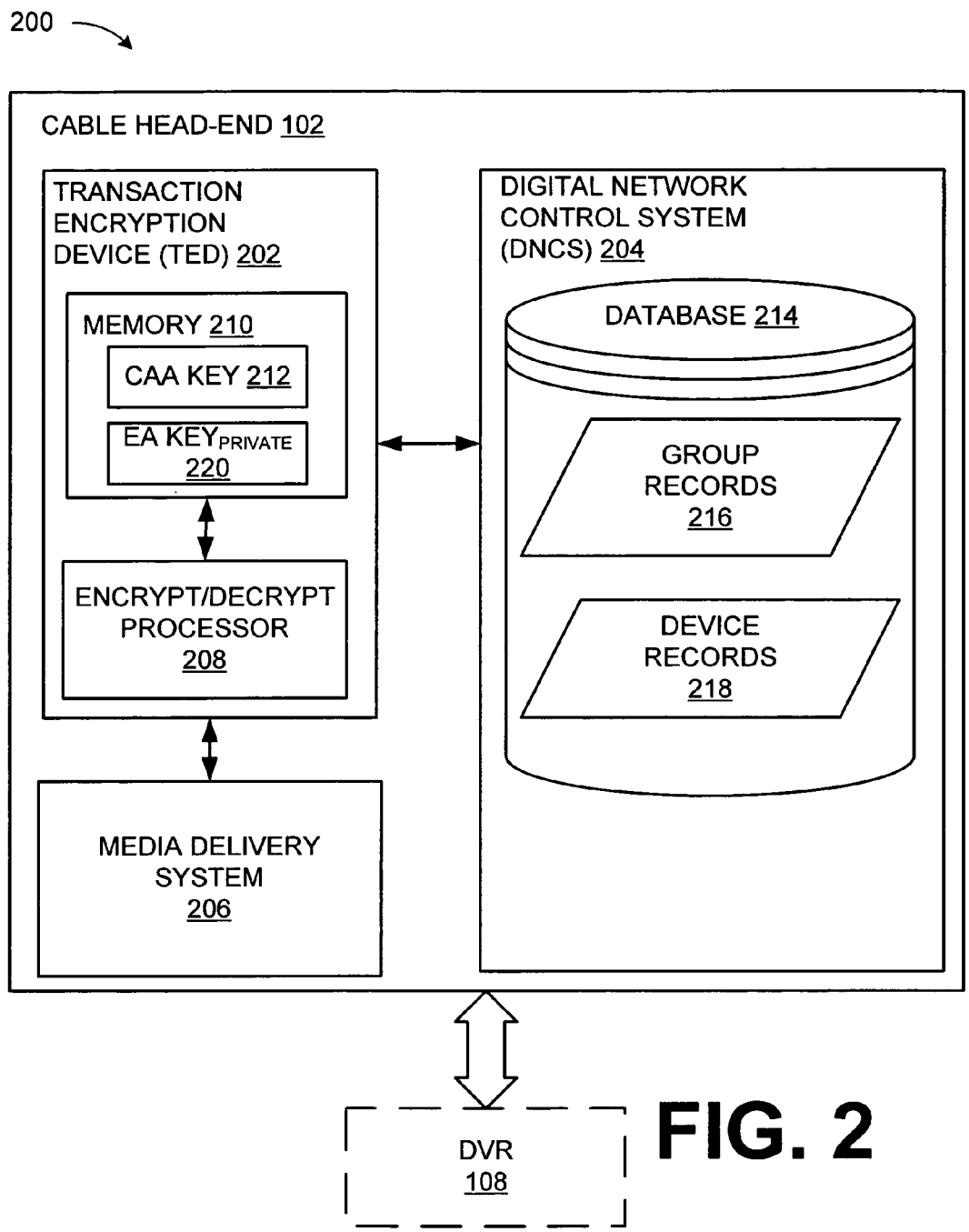
FIG. 2 depicts a block diagram of selected system components of a cable head-end of the secure delivery system of FIG. 1.
Figure 3:
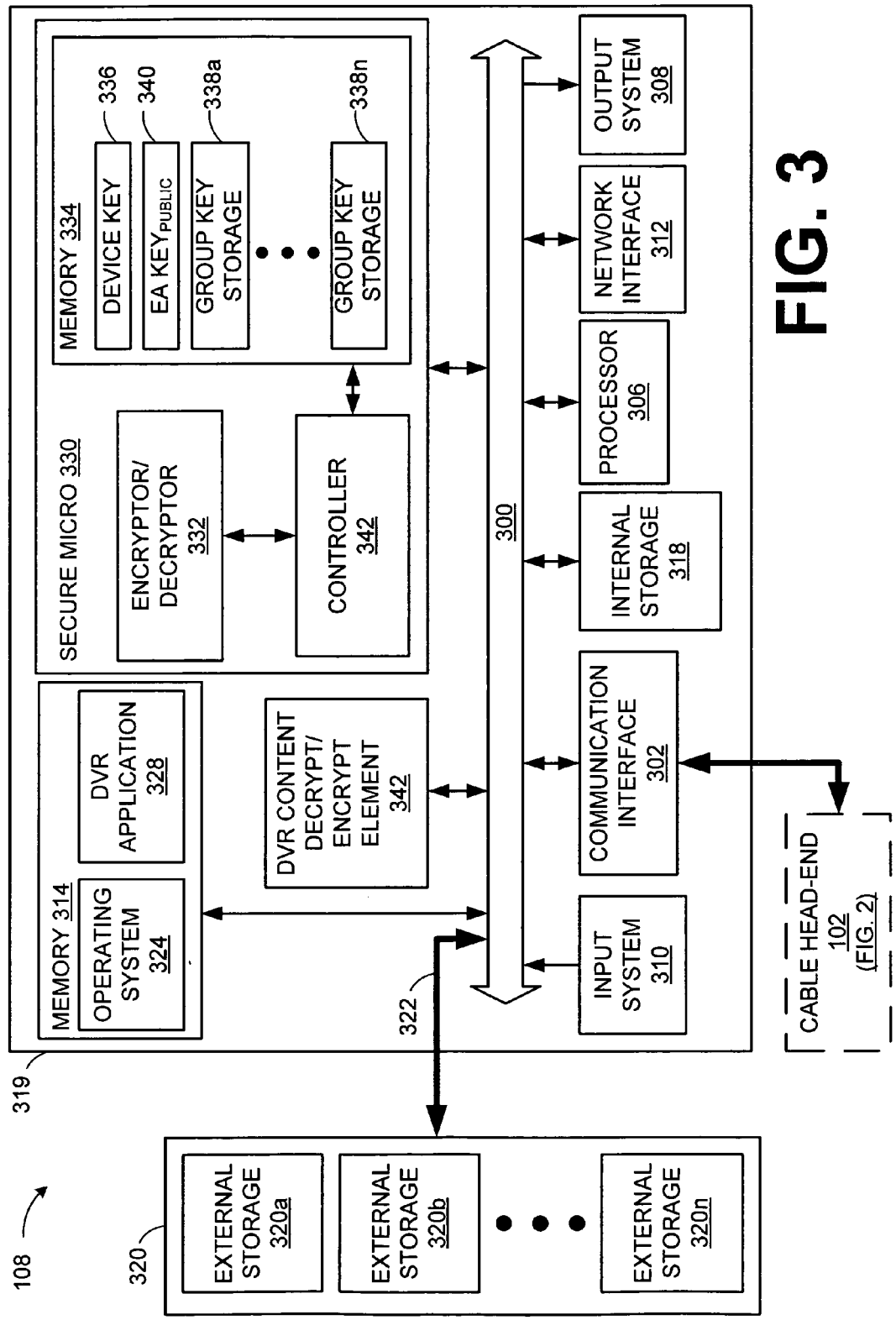
FIG. 3 depicts a block diagram of selected system components of an exemplary embodiment of a remote device such as the digital-video recorder (DVR) of FIG. 1.

FIG. 2 depicts a block diagram of the cable-head end 102 of the secure data delivery system 100 of FIG. 1. Associated with the cable head-end 102 may be a transaction encryption device (TED) 202, a digital network control system (DNCS) 204, and a media delivery system 206. Cable-head end 102 may be in communication with the remote media recording device, which can be DVR 108. It should be understood that, in accordance with some embodiments, omitted from FIG. 3 are a number of conventional components, known to those skilled in the art, that are unnecessary to explain the operation of the disclosed systems and methods for securing media content using an interchangeable encryption key.

In general, TED 202 can be used by other components associated with the cable-head end to securely encrypt and decrypt data. To this end, TED 202 may include an encryption/decryption processing element 208 which can be in communication with a memory 210 used for holding keys, such as a conditional access authority (CAA) key 212 and a private entitlement agent (EA) key 220. CAA key 212 can be, for example, a passphrase of suitable strength, among other possible key types. Private entitlement agent key 220 can be used for, among other uses, signing transmissions from the cable head-end 102 to enable remote devices having a corresponding public entitlement agent (EA) key to verify the source of received transmissions.

Processing element 208 can also be configured to generate a random key, which may be referenced herein as a group key or interchangeable key. The group key could be, for example, among other encryption key types, a triple data encryption Standard (3DES) key. Accordingly, it should be understood that the group key may actually comprise one or more keys. Additionally, although the group key may be described herein as a symmetric key, some embodiments may use asymmetric keys. More specifics of the operation of TED 202 will be discussed in detail below.

DNCS 204, among other functions, can be used for maintaining records pertaining to the remote devices (e.g. DVR's, set-top boxes, etc.). According to some embodiments, the remote devices may be grouped based on the type of services to which devices associated with the group are granted access. For example, the services could correspond to the types of media content that the remote devices are authorized to playback. However, it should be appreciated that other embodiments may group the remote devices based on other criteria.

According to one embodiment, the group could be a subscriber account. Thus, the devices associated with a particular subscriber account can be granted access to the same media content (e.g. media content delivered on one or more particular channels, purchased movies, etc.). According to such an embodiment, a billing system may store pertinent details about a subscriber account within the DNCS upon subscribing to a cable-television service. The subscriber account could represent, for example, an account associated with a specific person, business entity, home, etc. that is authorized to receive media content from the cable television provider. Once the subscriber account is set up, one or more remote devices may then be associated with the account.

Accordingly, looking to FIG. 2, group records 216 can be used to maintain records about a particular group (e.g. a subscriber account, etc.) and the records related to one or more remote devices can be referenced as device records 218.

Although depicted separately, group records 216 and device records 218 may be viewed as potentially being linked once a particular device record is associated with a group record. Additionally, although a single database 214 is depicted, it should be understood that the respective records may be spread across two or more physical or logical databases. More specific detail as to the operation of DNCS 204 will be discussed in later portions of this document.

Media delivery system 206 can provide media content signals from the head-end (or central office, server, etc.) to any of the plurality of remote devices, such as DVR 108. The content signals may comprise any of a number of programs (i.e. television shows, or other defined portion of a media signal), and each program provided can be referred to as an "instance" of media content. In some cases, media delivery system 206 may be configured to encrypt the instances of media content (i.e. using TED 202 or other encryption devices). In some cases, such encryption may encrypt every four seconds of media data, for example, to be delivered over transmission medium 106 (FIG. 1) to the remote device. If the subscriber associated with the device is entitled to watch the program of the encrypted instance, the remote device may then decrypt the encrypted instance. An overview of the encryption and decryption of the signals to and from a cable head-end can be found in U.S. Pat. No. 6,292,568, which is hereby incorporated by reference in its entirety.

FIG. 3 is a block diagram depicting selected system components of an exemplary embodiment of the DVR 108 of FIG. 1. Omitted from FIG. 3 are, in accordance with some embodiments, a number of conventional components known to those skilled in the art that are unnecessary to explain the operation of the disclosed systems and methods for securing media content using an interchangeable encryption key. FIG. 3 depicts several components commonly communicating through a local bus 300. For example, DVR 108 may include a communications interface 302 for receiving video, audio and other media signals from a media signal source, such as the cable head-end 102 (FIGS. 1 and 2). The communication interface 302 may include a tuner system (not depicted) which could include, for example, a tuner for receiving and selecting one or more selected channels of media signals. Such a tuner system can tune to a particular television station, and the media signals associated with this station can be recorded by the DVR 108.

DVR 108 can further include at least one processor 306 for controlling the operations of the DVR 108 and an output system 308 for driving a playback device (e.g., television 110). An input system 310 can receive user inputs provided via a wired or wireless input device such as, for example, a hand-held remote control, a transmitter with buttons or keys located on the exterior of the DVR, and/or a keyboard.

Network interface 312 can transmit and/or receive data over a network such as a LAN, WAN, or the Internet. For example, data may be transferred to/from another DVR, received from a media signal source, or from a centralized server through network interface 312. Such data could be media signals and or other data, such as programming information, or other data capable of being stored and or displayed to the user. Network interface 312 may comprise, for example, an Ethernet interface, an IEEE-1394 interface, a USB (Universal Serial Bus) interface, a serial interface, a parallel interface, a wireless radio frequency (RF) interface, a telephone line interface, a power line interface, a coaxial cable interface, and/or an infrared (IR) interface, among others.

Memory 314, which may include volatile and/or non-volatile memory, can store one or more programmed software applications, herein referred to as applications, which contain instructions that may be executed by processor 306 under the direction of operating system 324. Input data used by an application can be stored in memory 314 and read by processor 306 as needed during the course of the application's execution. This input data may be data stored in memory 314 by a secondary application or other source, either internal or external to DVR 108, or may be data that was created with the application at the time it was generated as a software application program.

Internal storage 318 may comprise a recordable medium and may be a number of devices available for non-volatile data storage, such as a hard disk drive (HDD), optical drive, or flash memory, for example. Internal storage 318 may be used for storing media data, such as encoded media signals generated from those signals received through communication interface 302 and/or network interface 312. According to some embodiments, it should be understood that media programming can be digitally encoded before being stored on recordable medium by the DVR itself or by means external from the DVR, such as the media signal source or a cable set-top box. Internal storage may also be used for storing non-media data, such as encryption keys and DRM information associated with stored media data.

Like internal storage 318, external storage 320 may also comprise a recordable medium and may be a number of devices available for non-volatile data storage, such as an HDD, optical drive, or flash memory, for example. However, unlike internal storage 218, which is located within the DVR enclosure (i.e. housing) 319, external storage 320 can be removably attached to DVR 102 through a communications interface 322, which could be any number of wireless or wired interfaces, for example.

Although only one external storage device may be used in some embodiments, it is contemplated that external storage 320 may comprise a plurality of storage devices 320*a*-320*n*. For example, devices 320*a*-320*n* could be a plurality of HDDs. It can be appreciated that the one or more HDDs could be daisy chained, or otherwise linked, to communicate with DVR 108 over the communications interface 322.

Although memory 314, internal storage 318, and/or external storage 320 have been described as potentially performing particular functions, according to some embodiments, these particular functions could be shared, or carried out completely, by any other of the memory and/or storage devices.

Communication interface 322 could be a bus operating under the Advanced Technology Attachment (ATA) standard, and more specifically, the Serial-ATA (i.e. SATA) standard version 2.5, which is available from the Serial ATA International Organization and is hereby incorporated by reference in its entirety. According to such an embodiment, DVR 108 may include a communications interface comprising an attachment port on the housing 319 of the DVR that cooperatively mates with the plug of external storage 320. A cable complying with the high-speed bus (i.e. a cable complying with the SATA standards) may provide the transmission medium between external storage 320 and the DVR 108. According to other embodiments, communications interface 322 could be a bus complying with the IEEE 1394 (Firewire), the Universal Serial Bus (USB), or IEEE 802.11 standards. It can be appreciated that a number of other communication interfaces 322 could be used.

One, or both of, internal storage 318 and/or external storage 320 could be used for recording media data to a transportable medium that is capable of being easily moved between a plurality of remote devices. For example, internal storage 318 and/or external storage 320 may be an optical drive configured to read and/or record to/from an optical medium. The transportable medium could also be flash memory such as used in USB thumb drives, smart digital (SD) memory or compact flash (CF) memory, among others. Accordingly, DVR 108 may be configured to record media data, which could comprise moving or copying media data from other storage devices, to the transportable medium. DVR 108 may also be configured to read media data from a transportable medium. Accordingly, the media data may be stored to a transportable medium, and the media data on the transportable medium may then be read by other devices, such as another DVR associated with a customer account. In that the media data is encrypted, embodiments disclosed herein describe systems and methods for sharing the media content between remote devices while maintaining the ability to decrypt the underlying media data by authorized devices.

User input received during the course of execution of any processes implemented by DVR 108 may be received from an input device (not shown) via input system 310, transmitted through the bus 300, temporarily stored within memory 314, and communicated to processor 306. Data generated by an application can be stored in memory 314 by processor 306 during the course of the application's execution. Availability, location, and amount of data generated by one application for consumption by another application can be communicated by messages through the services of operating system 324.

Under user instruction, DVR application 328 can perform the general tasks of recording and/or playback of received programs, among other tasks. DVR application 328 can also provide a navigation framework for services provided by DVR 108. For example DVR application 328 can register for, and in some case reserve, certain user inputs related to navigational keys such as channel increment/decrement, last channel, favorite channel, etc. DVR application 328 also provides users with television (or other programming) related menu options that correspond to DVR functions such as, for example, providing an interactive program guide, blocking a channel or a group of channels from being displayed in a channel menu, recording particular channels, playback of recorded shows, etc.

Portions of DVR application 328 and/or operating system 324 may also facilitate the encoding and decoding of media data and/or other information used in the described systems and methods for securing media content using an interchangeable encryption key. Specifically, operating system 324 or DVR application 328 may use a secure element, depicted as secure microprocessor 330, and/or DVR content decrypt/encrypt element 342 to perform such encryption and/or decryption.

For example, DVR content decrypt/encrypt element 342 includes a processor for performing encryption and/or decryption of media content. For example, decrypt/encrypt element 342 can decrypt the media content received from the head-end 102 or from other DVR components, such as internal storage 318 or external storage 320. DVR content decrypt/encrypt element 342 also encrypts and/or re-encrypts media content for storage to the internal or external storage mediums.

According to some embodiments, DVR content decrypt/encrypt element 342 can obtain keys for performing such encryption and decryption of media content from secure microprocessor 330. Secure microprocessor 330 may include a processor, such as encryptor/decryptor 332, for encrypting and decrypting keys used by DVR content decrypt/encrypt element 342 to perform encryption and decryption of media data.

Secure microprocessor 330 may include a memory 334 for storing a number of keys for encryption and/or decryption functions. For example, memory 334 can include a device key 336 stored therein, and one or more group key storage locations 338a-338n for the storage of respective group keys, and an entitlement agent (EA) key 340.

Device key 336 could be, for example, among others, a private key of the DVR 108. Device key 336 can be used to decrypt data encrypted with a public key associated with the private device key 336. According to such embodiments, device key 336 is typically kept from being exposed outside of the secure microprocessor 330 in clear form.

The one or more group key storage locations 338 can be used to hold group keys associated with a particular group of devices authorized to access (i.e., decrypt, decode, etc.) common media content. Although referred to as a "group" key, it should be understood that the group key could be associated with any number of devices, including zero. For example, a group could be a customer account. Although a "group key" may be assigned to this group, there may not be any devices yet associated with the customer account.

A number of potential embodiments for using group keys are described below. Nonetheless, in such embodiments, the group keys can be downloaded and stored into the group key storage locations 338a-338n and can also be replaced and/or deleted from these storage locations. Accordingly, the group keys are interchangeable. It should be understood that even though the group keys are interchangeable, in some embodiments the interchangeable keys may never, or seldom, change once stored within group key storage 338. Storage locations 338a-338n may comprise non-volatile memory locations, but could be volatile if the security policy of the service provider requires that the group keys be re-supplied and stored to the group key storage locations upon a reset of the DVR 108, for example. For that matter, the group keys may be restored to group key locations 338 periodically, according to predefined policies (e.g. of the service provider).

Public EA Key 340 is a public key associated with private EA key 220. Accordingly, public EA Key 340 can be used to verify that transmissions received from the cable-head end (or other transmissions signed with private EA key 220) are from a trusted source.

Secure microprocessor 330 can also include a controller 342 for controlling the operations of encryptor/decryptor 332 and/or for storing and/or retrieving the keys to/from memory 314.

The applications executed by DVR 108 can comprise executable instructions for implementing logical functions. The applications can be embodied in any computer-readable medium for use by or in connection with an instruction execution system. The instruction execution system may be, for example, a computer-based system, a processor-containing system, or any other system capable of executing instructions. In the context of this document, a "computer-readable medium" can be any means that can contain, store, communicate, propagate, or transport the program for use by or in connection with the instruction execution system, apparatus, or device.

The computer-readable medium can be, for example, but is not limited to, an electronic, solid-state, magnetic, optical, electromagnetic, infrared, or semiconductor system, apparatus, device, or propagation medium, either internal to DVR 108 or externally connected to the DVR 108 via one or more communication ports or network interfaces. More specific examples (a non-exhaustive list) of the computer-readable medium would include the following: an electrical connection (electronic) having one or more wires, a portable computer diskette (magnetic), a hard drive storage device (magnetic), a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 4:
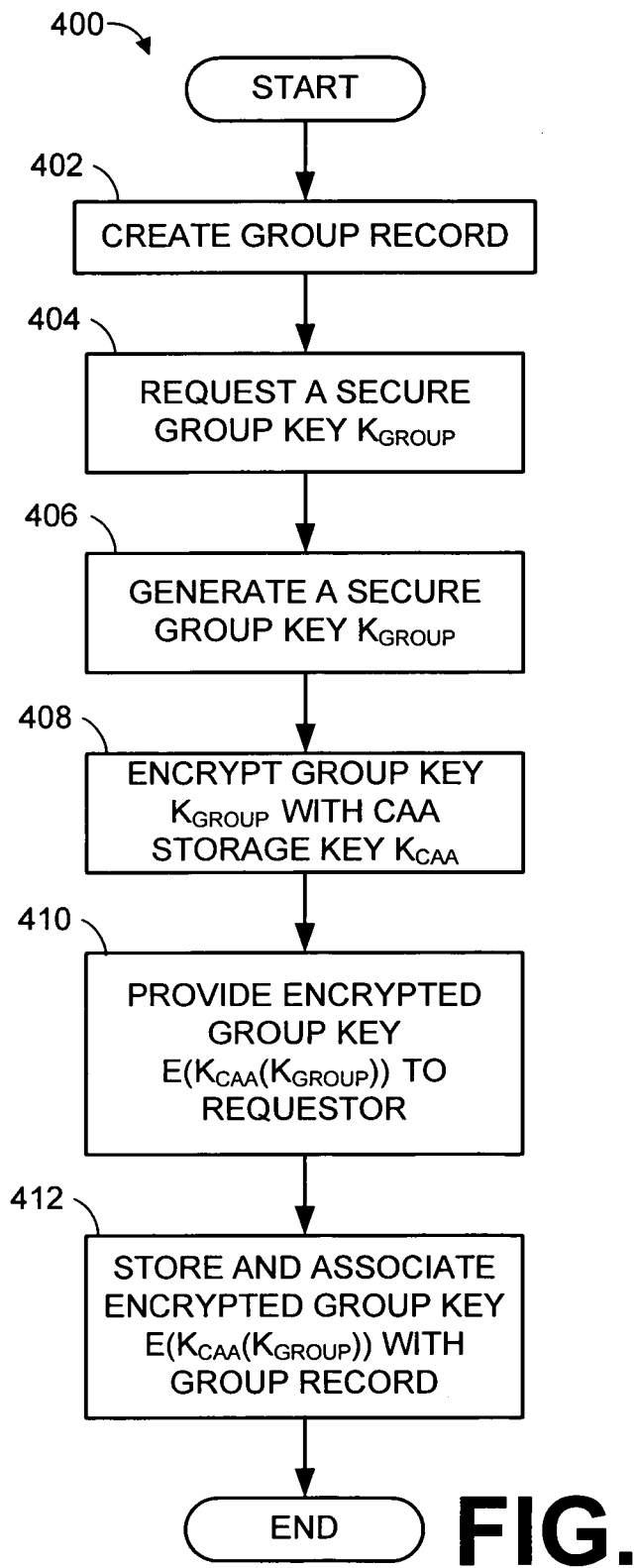
FIG. 4 depicts a flow diagram illustrating an embodiment of a process for creating a group record having a group key within the database of the cable head-end of FIG. 2.

Now that a general overview of the various components of system 100 have been described, FIG. 4 depicts a flow diagram illustrating an embodiment of a method 400 for creating a group record 216 having a group key within database 214. For example, in some embodiments, the steps are executed by components within the environment of the secure data delivery system 100.

Any process descriptions, steps, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the preferred embodiments of the systems and methods described herein in which steps or functions may be deleted, executed out of order from that shown or discussed, including substantially concurrently or in reverse order, depending on the functionality involved, as would be understood by those reasonably skilled in the art.

At block 402, a group record is created. For example, as explained above, the group record may correspond to a subscriber account that is created in response to a request from a billing system among other possibilities. At block 404, a secure group key is requested that can be associated with the group record. For example, in one embodiment, DNCS 204 requests the secure group key from TED 202. At block 406, the requested secure group key $K_{GROUP}$ is generated. At block 408 the group key $K_{GROUP}$ is encrypted to ensure that it is not exposed. For example, the group key $K_{GROUP}$ can be encrypted with the CAA Storage key 212, which may be referred to as $K_{CAA}$, to produce the encrypted group key $E(K_{CAA}(K_{GROUP}))$.

At block 410 the requested, encrypted group key $E(K_{CAA}(K_{GROUP}))$ is returned to the requestor. For example, according to one embodiment, the encrypted group key $E(K_{CAA}(K_{GROUP}))$ is transmitted from TED 202 to DNCS 214. At block 412, the encrypted group key $E(K_{CAA}(K_{GROUP}))$ can be stored and associated with the group record. For example, one embodiment stores the encrypted group key in database 214 of DNCS 204.

Accordingly, method 400 generates and associates a group key, in encrypted form, with a particular group record. As described, the group could represent an account, a household, or other entity having common media access rights.

One or more remote devices can be associated with a group record. For example, a number of DVRs can be associated with a specific customer account. Accordingly, a device record can be created for each device and each device record can then be associated with a respective group record. These device records may contain a group key that has been encrypted with the respective device's public key. The encrypted group key can then be transmitted to the device, decrypted, and stored within the device's secure microprocessor. These operations are, again, completed without allowing exposure to the group key in an unencrypted form.

Figure 5:
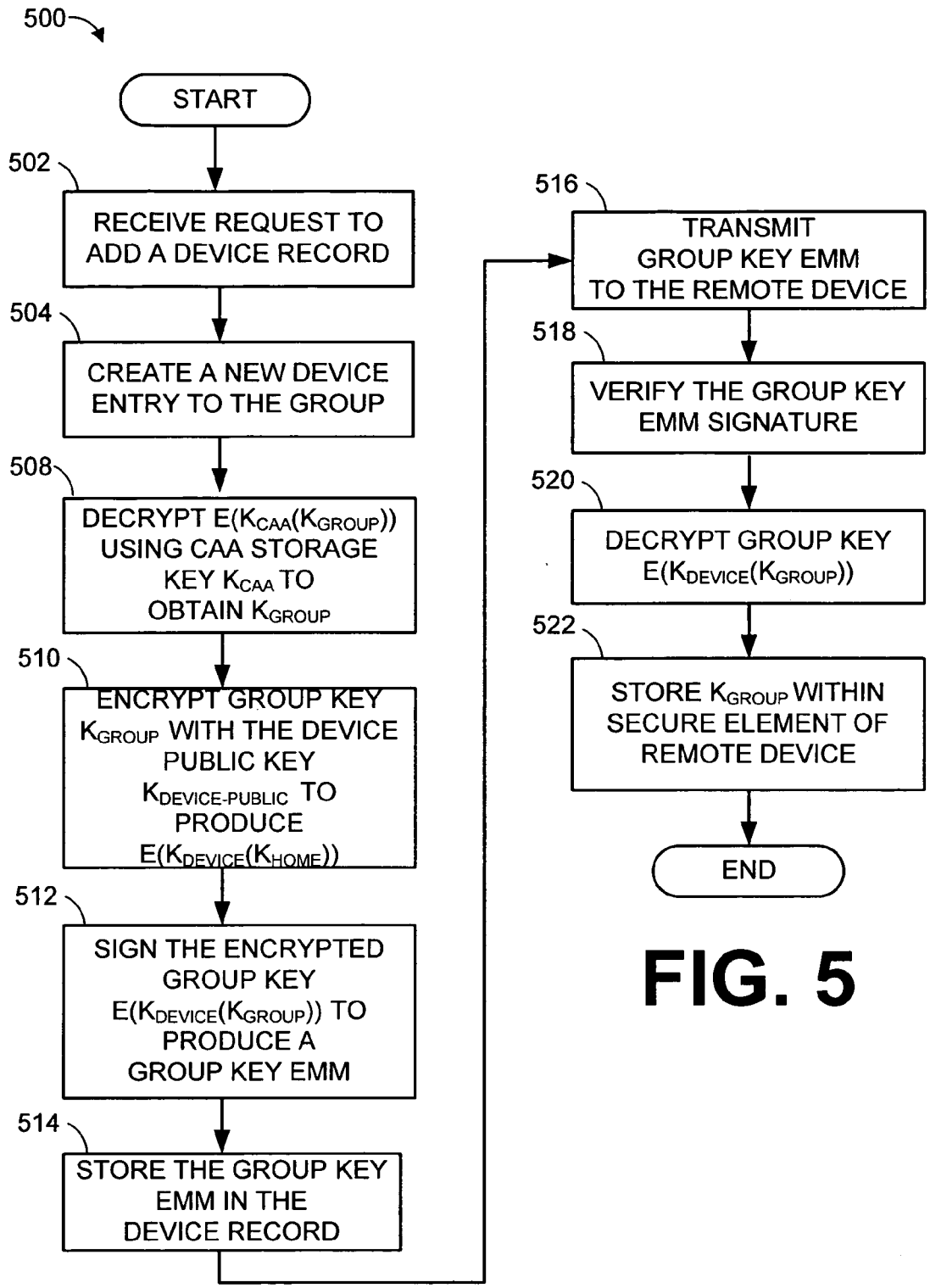
FIG. 5 depicts a flow diagram of an embodiment of a process for associating a trusted remote device record with a group record and for downloading a group key to a remote device.

Thus, reference may now be directed to FIG. 5, which depicts a flow diagram illustrating an embodiment of a method 500 for associating a trusted remote device record with a group record, and for downloading the group key to the device. At block 502 a request to add a device record can be received. For example, the request can originate from a billing system and be received by DNCS 204. The request to add the trusted device can include the identification of a specified device and specified group record to be associated with one another. Accordingly, at block 504 an entry for the new device record can be made within, or otherwise associated with, the group record. The device record can include a public key, $K_{DEVICE-PUBLIC}$, that is associated with the private device key 336, $K_{DEVICE-PRIVATE}$, of the respective remote device. Accordingly, in some embodiments, a device record 218 having such information is stored within database 214.

Once the device record is generated, the group key to be associated with the device can be stored within the device record. However, in order to remain secure, the group key is stored in an encrypted form that can be decrypted by the remote device. Accordingly, at block 508 the group key stored in the respective group record can be retrieved and decrypted. For example, group key $E(K_{CAA}(K_{GROUP}))$, encrypted with the CAA storage key 212, is decrypted to obtain the group key $K_{GROUP}$ in the clear. At block 510 the device's public key $K_{DEVICE-PUBLIC}$, is used to encrypt group key $K_{GROUP}$ to generate $E(K_{DEVICE-PUBLIC}(K_{GROUP}))$. Such encryption and decryption can be performed by TED 202, for example.

At block 512, the encrypted group key can be signed to produce a group key Entitlement Management Message (EMM), which is a signed message holding the group key (encrypted by the device's public key). For example, a private entitlement agent key $K_{EA-PRIVATE}$, may be used by TED 202 to sign the EMM. In general, an EMM comprises an encrypted message containing private conditional access information about the authority for a device to receive services, such as those provided by a cable or satellite television operator. Accordingly, this group key EMM may serve the purpose of providing a receiving remote device with the information needed to conditionally decrypt media content received by and/or stored in the DVR 108. That is, the conditional access can be provided by the particular group key that is capable of being used to decrypt media data encrypted with the group key.

At block 514, the group key EMM for the new device can be stored with the device record, and at block 516 the home key EMM can be transmitted to the remote device. At block 518, the signature of the EMM can be authenticated. For example, the secure microprocessor of the receiving remote device may use a public entitlement agent key $K_{EA-PUBLIC}$ associated with the private key used to sign the EMM (i.e. $K_{EA-PRIVATE}$) to authenticate the EMM. If the EMM is successfully authenticated, at block 520 the EMM can be decrypted to obtain the group key $K_{GROUP}$ in clear (i.e. unencrypted) form. For example, the EMM can be decrypted using the secure element private key $K_{DEVICE-PRIVATE}$ to recover the group key $K_{GROUP}$. At block 522 the group key can be stored into a free memory location associated with the device. For example, the device secure microprocessor can stores the group key $K_{GROUP}$ into memory location 338, which cannot be accessed from outside of the secure microprocessor. Accordingly, using the above process, the group key $K_{GROUP}$ can be transmitted from the head-end to the remote device without exposing the key in an unencrypted form.

Figure 6:
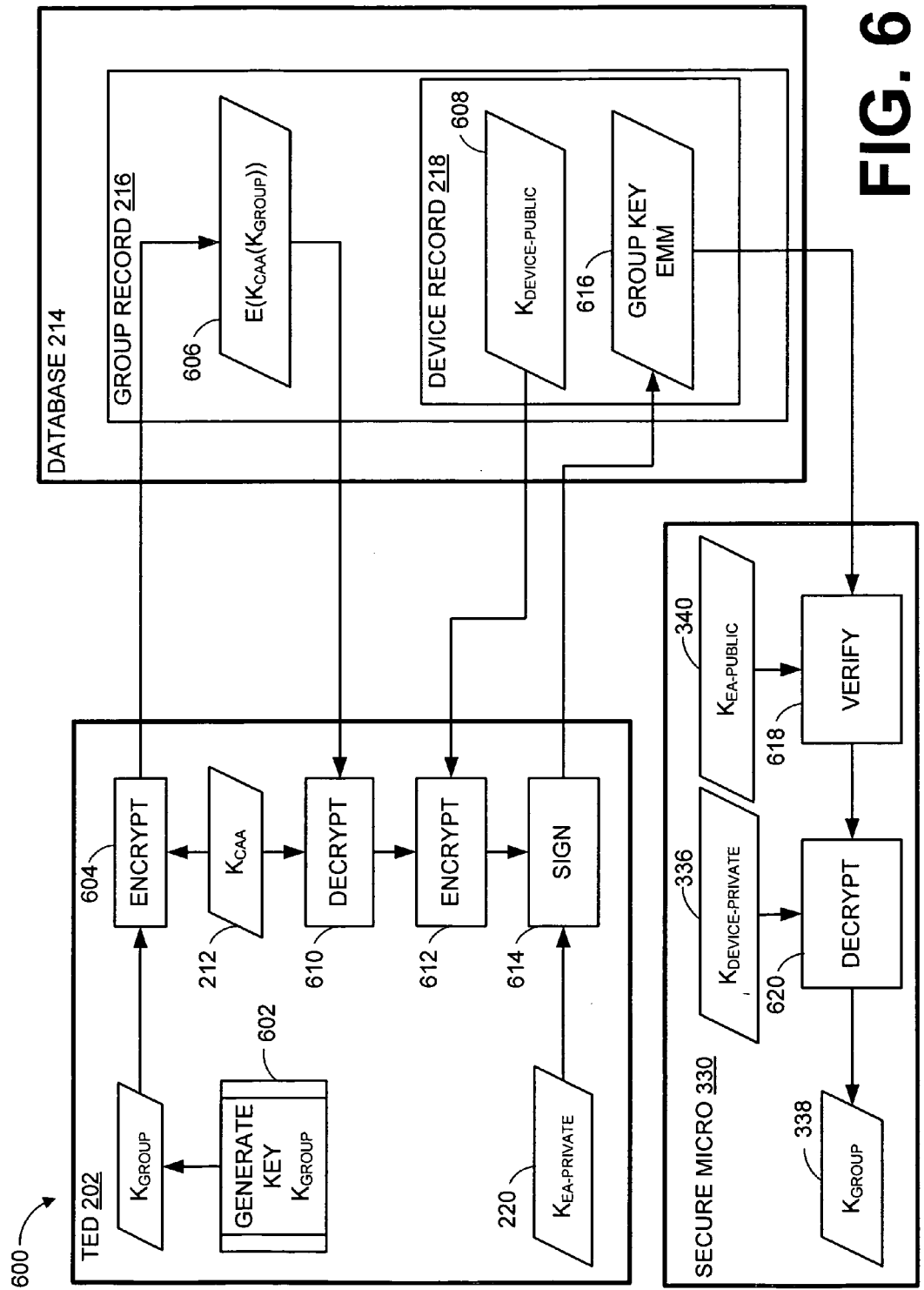
FIG. 6 depicts a data flow diagram applying the process embodiments of FIGS. 4 and 5 to embodiments of the secure data delivery system of FIG. 1.

Reference may also be made to FIG. 6, which depicts an exemplary data flow diagram 600 that applies the methods 400 and 500 to embodiments of the secure data delivery system 100. For example, a group record 216 can be created in database 214 (i.e. in response to a request from a billing system, etc.). At block 602, TED 202 can generate a group key $K_{GROUP}$ for association with the newly created group record 216. However, in order to avoid non-secure exposure of the group key, at block 604 TED 202 encrypts group key $K_{GROUP}$ with CAA Storage Key $K_{CAA}$, to produce encrypted group key 606 $E(K_{CAA}(K_{GROUP}))$, which can be stored into the group record 216 of database 214.

When a trusted remote device (i.e. PVR, DVR, set-top box, etc.) is to be associated with the group, an associated device record 218 is created (i.e. at the request of a billing system, etc.) and associated with a specified group record 216. The device record may include a public key 608, referred to as $K_{DEVICE-PUBLIC}$, that is associated with a private device key 336 of the remote device. The device key 336 of the remote device may also be referred to as $K_{DEVICE-PRIVATE}$.

TED 202 retrieves the group key, encrypted with the CAA key 212, from database 214, denoted in FIG. 6 as $E(K_{CAA}(K_{GROUP}))$, for decryption at block 610. TED 202 decrypts $E(K_{CAA}(K_{GROUP}))$, using the CAA key 212 (i.e. $K_{CAA}$) to obtain the group key $K_{GROUP}$. TED 202 can retrieve the device's public key $K_{DEVICE-PUBLIC}$ from database 214 and, at block 612, the group key $K_{GROUP}$ can be encrypted using the remote device's public key $K_{DEVICE-PUBLIC}$ to generate $E(K_{DEVICE-PUBLIC}(K_{GROUP}))$. At block 614, TED 202 signs the encrypted group key to produce a group key Entitlement Management Message (EMM), which is a signed message including the group key, as encrypted by the device's public key.

The group key EMM 616 for the new device can be stored into the associated device record 218. The DNCS 204 (FIG. 2) can then retrieve the group key EMM 616 from database 214 and transmit the group key EMM to the remote device where, at block 618, the device secure microprocessor 330 authenticates the EMM using the public key $K_{EA-PUBLIC}$ 340 associated with $K_{EA-PRIVATE}$ 220. If the EMM is successfully authenticated, at block 620 the device secure microprocessor decrypts $E(K_{DEVICE-PUBLIC}(K_{GROUP}))$ using the secure element private key $K_{DEVICE-PRIVATE}$ 336, thereby recovering the group key $K_{GROUP}$. The device secure microprocessor can then store the group key $K_{GROUP}$ into memory location 338. Memory location 338 cannot be accessed from outside of the secure microprocessor, allowing $K_{GROUP}$ to remain completely secure. Accordingly, the group key $K_{GROUP}$ can be transmitted from a head-end to the remote device without exposing the group key in an unencrypted form.

Now that systems and methods have been described for provisioning the group key to a particular remote device, such as DVR 108, methods for encrypting and decrypting content using the group key are described. For example, FIG. 7 depicts a flow diagram of a process 700 for encrypting media data using the group key stored within the secure microprocessor of the DVR 108. At block 702 an instance of media content can be delivered to the remote device from a media source. For example, the media delivery system 206 of cable head-end 102 can deliver media content to DVR 108.

In some cases, the media content delivered to the device may be encrypted. Accordingly, if necessary, at block 704 the media content is decrypted into clear media content such as with DVR content decrypt/encrypt element 342. Additionally, according to some embodiments, the clear media content has been digitally encoded, either at the head-end or within the remote device. Thus, the clear media content may be embodied within media data, which is in the clear from encryption.

At block 706, a random number can be generated to use as a content key $K_C$ for encrypting the particular instance of media data that is, or will be, stored on a storage device associated with the remote device. At block 708 the instance of media data can be encrypted with the generated content key $K_C$. Content key $K_C$ can also be used later for decrypting the associated instance of media data. At block 710 the encrypted media data can be stored to a storage medium. For example, the media data could be stored to internal storage 318 or external storage 320, among other data storage locations. At block 712 the instance's respective content key $K_C$ can be encrypted with a group key $K_{GROUP}$ to produce an encrypted content key $E(K_{GROUP}(K_C))$. At block 714, the encrypted content key $E(K_{GROUP}(K_C))$ can be securely stored on a storage medium and associated with the media data instance.

Figure 8:
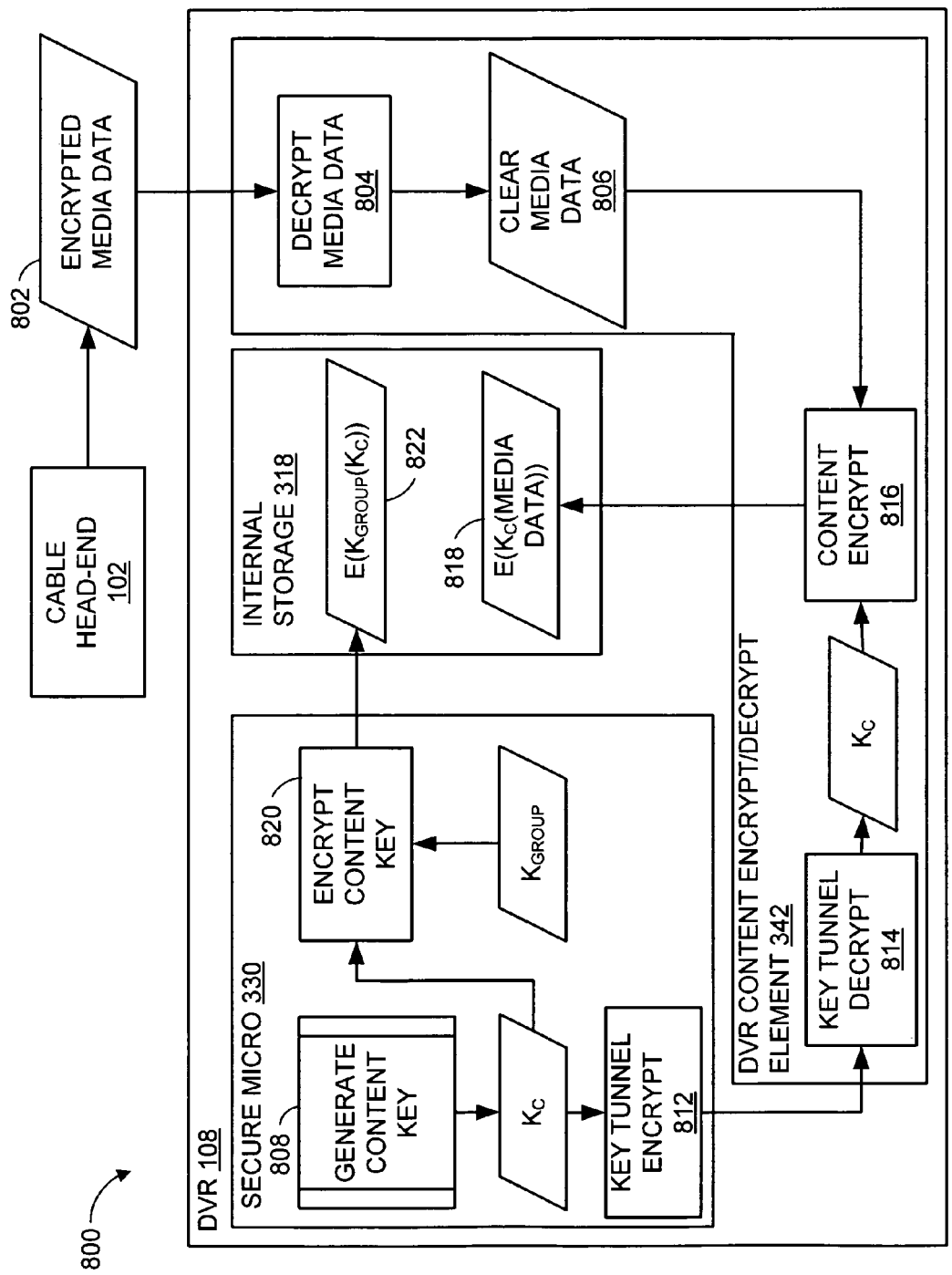
FIG. 8 depicts a data flow diagram applying the method embodiments of FIG. 7 to embodiments of the secure data delivery system of FIG. 1.

Reference may also be made to FIG. 8, which depicts an exemplary data flow diagram 800 that applies the embodiments of method 700 to embodiments of the secure data delivery system 100. According to the embodiments of FIG. 8, the media source is depicted as cable head-end 102, which transmits an instance of encrypted media content 802 to the DVR 108. The instance of encrypted media content 802 is passed to DVR content encrypt/decrypt element 342 for decryption into clear media data 806 at block 804.

At block 808, the secure microprocessor 330 can generate a random number to use as a content key $K_C$ for encrypting (or, rather, re-encrypting) the particular instance of media data.

According to some embodiments, in order to avoid the clear media data 806 being exposed in clear form, DVR content encrypt/decrypt element 342 encrypts clear media data 806 with the content key $K_C$ generated by secure microprocessor 330. Thus, a secure tunnel is formed in order to pass content key $K_C$ from secure microprocessor 330 to DVR content encrypt/decrypt element 342. Specifically, at block 812, the content key $K_C$ is encrypted and passed to DVR content encrypt/decrypt element 342. At key tunnel decrypt block 814, DVR content encrypt/decrypt element 342 can decrypt content key $K_C$, to provide the content key $K_C$ in clear form. The content key can then be used to encrypt the clear media data 806 at block 816.

Accordingly, at block 816 DVR content encrypt/decrypt element 342 encrypts the instance of media data with the content key $K_C$, and the encrypted media data 818 (i.e. $E(K_C$ (MEDIA-DATA))) can be stored to a storage device, such as internal storage 318. At block 820 the secure microprocessor 330 encrypts the instance's content key $K_C$ with a group key $K_{GROUP}$ stored in the secure microprocessor 330 to produce an encrypted content key 822 (i.e. $E(K_{GROUP}(K_C))$) and stores the encrypted content key 822 securely to a storage device, such as internal storage 318.

Now that systems and methods for encrypting an instance of media content using a group key have been disclosed, system and method embodiments for decrypting media content using the group key are described. For example, FIG. 9 depicts a flow diagram of a process 900 for decrypting media data using the group key.

At block 902 a request to decrypt an instance of media data previously encrypted with an associated content key $K_C$ is received. For example, DVR application 328 may receive a request from a user to view a particular television show corresponding to the instance of encrypted media data 818 (FIG. 8). At block 904, the appropriate key for decrypting the media data is determined and the encrypted content key $E(K_{GROUP}(K_C))$ is retrieved from the storage medium. The DVR 108 may, for example, keep a table or other data structure that associates the encrypted content keys $E(K_{GROUP}(K_C))$ with the instances of encrypted media data. Accordingly, such a table can be accessed to find the encrypted content key $E(K_{GROUP}(K_C))$ associated with the instance of encrypted media data.

At block 906 the encrypted content key $E(K_{GROUP}(K_C))$ can be decrypted with the group key to retrieve the content key $K_C$. At block 908 an instance of media content encrypted with content key $K_C$ is retrieved. At block 910 the instance of media data can be decrypted with its associated content key Kc to obtain the instance of media data in the clear. The decrypted media can, for example, be used for decoding and/or display on television 110 or for other purposes.

Figure 10:
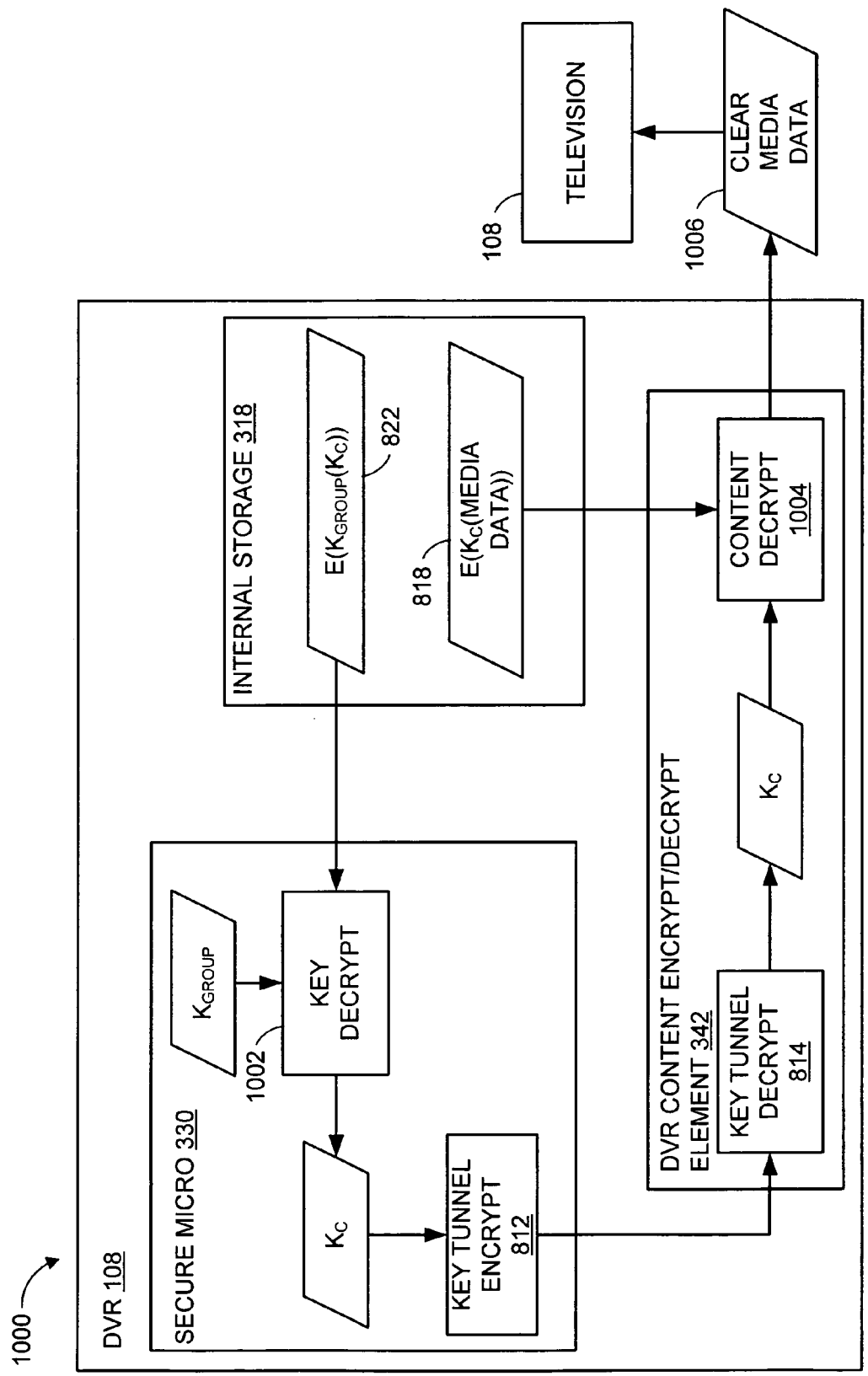
FIG. 10 depicts an exemplary data flow diagram applying the process embodiments of FIG. 9 to embodiments of the secure data delivery system of FIG. 1.

Reference may also be made to FIG. 10, which depicts an exemplary data flow diagram 1000 that applies method 900 to embodiments of the secure data delivery system 100. Upon receiving a request for a particular instance of media content, at block 1002 DVR 108 can receive and decrypt the encrypted content key $E(K_{GROUP}(K_C))$ associated with the encrypted media data $E(K_C(MEDIA\text{-}DATA))$ from the storage medium.

At block 1004 the DVR content encrypt/decrypt element 342 receives and decrypts the instance of media data $E(K_C(MEDIA\text{-}DATA))$ with the associated content key $K_C$ to produce clear media data 1006. The decrypted media data can then be used for decoding and display on a display device, such as television 110.

According to some embodiments, similar to the encryption tunnel described with respect to FIG. 8, secure microprocessor 330 encrypts content key $K_C$ at block 812 in order to securely deliver the content key to DVR content encrypt/decrypt element 342. DVR content encrypt/decrypt element 342 can then decrypt content key $K_C$ using key tunnel decrypt 814 in order to decrypt the instance of media content at block 1004, as described above.

Accordingly, systems and methods have been described for securing media content using an interchangeable encryption key, which has been referred to from time to time as a group key. Such systems and methods can be used to allow multiple remote devices that share an identical group key to also share associated stored media data. That is, any media data encrypted using a specified group key can be decrypted by any device having access to that same group key.

According to one embodiment, the group can correspond to a customer account. For example, assuming that each DVR associated with a customer account is authorized to decrypt and view common content, a single group key could be shared among the DVRs associated with the customer account (i.e. using method embodiment 500).

Such an embodiment can be used to share media content between a number of digital media devices (i.e. DVRs 108 and 108*a*) at a user premises 104 (FIG. 1) or any other digital media devices which share the same group key. Such media content could be shared over the communications medium 112 or via a transportable storage medium (e.g. via external storage 320, among other transportable storage mediums). Using such an approach, a first DVR may record media content to external storage 320 and the associated encrypted content key can also be stored to external storage 320. The encrypted media content and associated encrypted content key can then be transferred to the second DVR (i.e. external storage 320 can be attached to the second DVR or the encrypted media content and encrypted content key can be transferred over communications medium 112). Because both the first and second DVR have matching group keys, the second DVR can then receive and decrypt the associated encrypted content key with the group key in order to recover the encrypted media content.

Although one embodiment may share common group keys among devices having a common customer account, other schemes are intended to be included within the scope of this disclosure. For example, based on rules determined by the media provider (e.g. cable operator, etc.), the keys could be shared between groups of customers having different subscriber accounts but having common subscription plans. Such a plan could, for example, allow the remote devices of friends sharing the same media access provisions to be capable of sharing media data between their respective remote devices. Such media data could be shared over a LAN, wide-area network (WAN), or via attachment of a portable storage medium, such as, a recordable optical disk, or an external HDD, among others.

Thus, one potential benefit is that media content encrypted by another device can be decrypted and used by any other device sharing the interchangeable group key. Such a benefit can be helpful in the case that an end user upgrades or replaces the remote device. In such a case, the media data encrypted a first remote device can be transferred to, or otherwise made available to, the new remote device. The new remote device can then be provided with the one or more group keys of the old remote device (i.e. according to an embodiment of process 500), thereby allowing the media data content to be decrypted by the new remote device (i.e. according to an embodiment of process 900).

Just as one or more group keys can be provided to a particular remote device, the one or more group keys can be removed and/or replaced. For example, an EMM may be transmitted to a remote device that clears any or all of the group keys, or otherwise replaces one or more group keys with keys that are unable to decrypt the content keys previously used to encrypt at least some of the media data stored on an associated storage device.

Thus, a media provider could remotely control whether a user can access any of the stored media content on the device by selective removal of any of the group keys. Thus, upon receiving an un-subscription request from a user, a cable television provider could remove the ability to view content already stored on the storage device instantaneously and securely. Because the group keys can be provisioned based on the access rights of the customer, such deactivation may merely cause only selected media content to become unavailable. For example, the cable operator may provision group keys for users that subscribe to premium television channels, and the instance keys used to record media content from these premium television channels can be selectively encrypted with the associated group key. If such a "premium content" group key is then removed from the remote device upon a customer's unsubscription from the premium television channel, content previously recorded is no longer accessible by the user. Such remote deactivation could also be used to remotely and securely de-authorize non-paying subscribers.

Conditional language, such as, among others, "can," "could," "might," or "may," unless specifically stated otherwise, or otherwise understood within the context as used, is generally intended to convey that certain embodiments could include, but others do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, At least the following is claimed:

1. A method for securing media content comprising:
   maintaining, by a server, a group key, wherein the group key is used to encrypt and decrypt content on at least one digital media recording device located remotely from the server;
   associating, by the server, digital media recording devices with a customer account;
   associating, by the server, the maintained group key to the associated customer account;
   associating, by the server, a group record with the associated maintained group key;
   associating, by the server, the associated group record with the customer account;
   adding, by the server, a first digital media recording device to the associated group record with the maintained group key on the server, wherein adding the first media recording device comprises:
      receiving, by the server, a request to add the first digital media device to the group record associated with the customer account;
      receiving, by the server, an identification of the first digital media device and an identification of the group record;
      creating, by the server, an entry for a record for the first digital media device in the received identified group record;
      generating, by the server, a device record for the first digital media device using the created entry;
      encrypting, by the server, the maintained group key with a public key of the first digital media recording device, wherein the public key is associated with a private device key of the first digital media recording device; and
      signing, by the server, the encrypted maintained group key;
   generating, by the server, a group key entitlement management message (EMM), wherein the EMM comprises private conditional access information about authority of the first digital recording media device to receive service; and
   transmitting, by the server, the generated EMM to secure microprocessor of the first digital media recording device at a memory location on the secure microprocessor which cannot be accessed from outside of the secure microprocessor.

2. The method of claim 1, further comprising:
   encrypting media content recorded by the first digital media recording device using a content key generated by the first digital media recording device;
   encrypting the content key using the group key; and
   storing the encrypted media content and the encrypted content key on a first storage device associated with the first digital media recording device.

3. The method of claim 2, further comprising:
   transmitting the EMM from the server to a second digital media recording device having a common media authorization to the first digital recording device; and
   storing the EMM within memory associated with the second digital media recording device.

4. The method of claim 3, further comprising:
   connecting the first storage device having the encrypted media content and the encrypted content key to the second digital recording device;
   decrypting the encrypted content key using the group key stored within the memory associated with the second device to obtain the content key; and
   decrypting the encrypted media content using the content key.

5. The method of claim 1, wherein maintaining the group key comprises maintaining the group key for the plurality of digital media recording devices, the plurality of digital media recording devices located at a user premises.

6. The method of claim 1, wherein receiving, by the server, the request to add the first digital media device to the group record comprises receiving the request from a billing system associated with a service provided to the customer.

7. The method of claim 1, wherein receiving, by the server, the request to add the first digital media device to the group record comprises receiving the request to add a digital video recorder (DVR) to the group record.

8. A system for securing media content comprising:
   a processor, and
   a memory coupled to the processor storing instructions that when executed by the processor causes the processor to perform a method comprising:
      maintaining a group key, wherein the group key is used to encrypt and decrypt content on at least one digital media recording device located remotely from the server;
      associating digital media recording devices with a customer account;
      associating the maintained group key to the associated customer account;
      associating a group record with the associated maintained group key;
      associating the associated group record with the customer account;
      adding a first digital media recording device to the associated group record with the maintained group key on the server, wherein adding the first media recording device comprises;
         receiving a request to add the first digital media device to the group record associated with the customer account;
         receiving an identification of the first digital media device and an identification of the group record;
         creating an entry for a record for the first digital media device in the received identified group record;
         generating a device record for the first digital media device using the created entry;
         encrypting the maintained group key with a public key of the first digital media recording device, wherein the public key is associated with a private device key of the first digital media recording device; and
         signing the encrypted maintained group key;
      generating a group key entitlement management message (EMM), wherein the EMM comprises private conditional access information about the authority of the first digital recording media device to receive service; and
      transmitting the generated EMM to a secure microprocessor of the first digital media recording device at a memory location on the secure microprocessor which cannot be accessed from outside of the secure microprocessor.

9. A system for securing media content comprising:
a first digital media recording device;
a server connected to the digital media device, wherein the server comprises a non-transitory medium containing instructions which when executed causes the server to perform the steps of:
  maintaining a group key, wherein the group key is used to encrypt and decrypt content on at least one digital media recording device located remotely from the server;
  associating digital media recording devices with a customer account;
  associating the maintained group key to the associated customer account;
  associating a group record with the maintained group key;
  associating the group record with the associated customer account;
  adding the first digital media recording device to the associated group record with the maintained group key on the server;
  receiving a request to add the first digital media device to the group record associated with the customer account;
  receiving an identification of the first digital media device and an identification of the group record;
  creating an entry for a record for the first digital media device in the received identified group record;
  generating a device record for the first digital media device using the created entry;
  encrypting the maintained group key with a public key of the first digital media recording device, wherein the public key is associated with a private device key of the first digital media recording device;
  signing the encrypted maintained group key;
generating a group key entitlement management message (EMM), wherein the EMM comprises private conditional access information about the authority of the first digital recording media device to receive service; and
transmitting the generated EMM to a secure microprocessor of the first digital media recording device at a memory location on the secure microprocessor which cannot be accessed from outside of the secure microprocessor.

10. The system of claim 9, wherein instructions which when executed further causes the secure microprocessor of the first digital media device to perform the step of authenticating the EMM.

11. The system of claim 10, wherein the instructions which when executed further causes the secure microprocessor of the first digital media device to perform the step of decrypting the EMM to obtain the group key.

12. The system of claim 10, wherein the instructions which when executed further causes the secure microprocessor of the first digital media device to perform the step of storing the group key to the memory location.

13. The system of claim 9, wherein the first digital media device is a digital video recorder (DVR).

14. The system of claim 9, wherein the first digital media device is located at a remote location from the server.

15. The system of claim 9, wherein the instructions which when executed further causes the first digital media device to perform the step of receiving media content from the headend device.

16. The system of claim 15, wherein the media content received from the headend device is encrypted with the group key.

17. The system of claim 16, wherein the instructions which when executed further causes the first digital media device to perform the step of decrypting the media content using the group key.

18. The system of claim 17, wherein the instructions which when executed further causes the first digital media device to perform the step of storing the decrypted media content on a storage device.

19. The system of claim 18, wherein the instructions when executed further causes the first digital media device to perform the step of sending the decrypted media content to a display device associated with the first digital media device.

* * * * *